US012704680B2

(12) United States Patent
Zhang et al.

(10) Patent No.: US 12,704,680 B2
(45) Date of Patent: Aug. 11, 2026

(54) ARRAYED WAVEGUIDE GRATING WITH REUSABLE DELAY LINE (AWG-RDL)

(71) Applicants: UNIVERSITY OF MARYLAND, COLLEGE PARK, College Park, MD (US); CALIFORNIA INSTITUTE OF TECHNOLOGY, Pasadena, CA (US)

(72) Inventors: Yang Zhang, Hyattsville, MD (US); Mario Dagenais, Chevy Chase, MD (US); Sylvain Veilleux, Chevy Chase, MD (US); Jiahao Zhan, College Park, MD (US); Pradip Gatkine, Pasadena, CA (US); Wei-Lun Hsu, Silver Spring, MD (US)

(73) Assignees: UNIVERSITY OF MARYLAND, COLLEGE PARK, College Park, MD (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 258 days.

(21) Appl. No.: 18/197,857

(22) Filed: May 16, 2023

(65) Prior Publication Data

US 2024/0053541 A1 Feb. 15, 2024

Related U.S. Application Data

(60) Provisional application No. 63/427,674, filed on Nov. 23, 2022, provisional application No. 63/364,792, filed on May 16, 2022.

(51) Int. Cl.
*G02B 6/28* (2006.01)
*G02B 6/12* (2006.01)

(52) U.S. Cl.
CPC ....... *G02B 6/2861* (2013.01); *G02B 6/12009* (2013.01); *G02B 6/12011* (2013.01)

(58) Field of Classification Search
CPC .............. G02B 6/12011; G02B 6/2861; G02B 6/12019; G02B 6/12009; G02B 6/125;
(Continued)

(56) References Cited

U.S. PATENT DOCUMENTS 5,841,929 A * 11/1998 Komatsu ................ G02B 6/125 385/32
6,826,334 B2 11/2004 Yoneda
(Continued)

FOREIGN PATENT DOCUMENTS

WO WO-2021227660 A1 * 11/2021

OTHER PUBLICATIONS

Hu et al., "Integrated Arbitrary Filter with Spiral Gratings: Design and Characterization," *Journal of Lightwave Technology*, May 2020, 38(16): pp. 4454-4461. (8 pages).
(Continued)

*Primary Examiner* — Thomas A Hollweg
*Assistant Examiner* — Marc E Manheim
(74) *Attorney, Agent, or Firm* — Rowan Tree Law Group, PLLC; Frederick F. Rosenberger

(57) ABSTRACT

An arrayed waveguide grating (AWG) can have a reusable delay line, a plurality of coupling devices, and a free propagation region (FPR). The delay line can have a continuous first waveguide connected to receive a plurality of wavelengths. Each coupling device can have a second waveguide coupled to a respective portion of the continuous first waveguide. The FPR can have input and output ends. The input end of the FPR can be coupled to receive the radiation from each of the coupling devices. The radiation can be directed to spatially-separated output channels based on wavelength at the output end of the FPR. The plurality of
(Continued)

coupling devices and the delay line are configured to control power and phase distributions of the radiation transmitted to the FPR.

20 Claims, 13 Drawing Sheets
(4 of 13 Drawing Sheet(s) Filed in Color)

(58) Field of Classification Search
CPC ............ G02B 6/12014; G02B 6/12016; G02B 6/12021; G02B 6/12023; G02B 6/12026; G02B 6/12028; G02B 6/1203; G02B 6/12033
See application file for complete search history.

(56) References Cited

U.S. PATENT DOCUMENTS

| | | | | |
|---|---|---|---|---|
| 7,043,108 | B1 * | 5/2006 | Olsen | G02B 6/2861 385/27 |
| 8,958,665 | B2 | 2/2015 | Evans et al. | |
| 10,488,589 | B2 | 11/2019 | Trita | |
| 2006/0029320 | A1 * | 2/2006 | Chiaretti | G02F 1/2955 385/14 |
| 2006/0132764 | A1 * | 6/2006 | Grek | G01J 3/0259 356/328 |
| 2009/0129779 | A1 * | 5/2009 | Bernasconi | H04J 14/0305 398/79 |
| 2010/0196005 | A1 * | 8/2010 | Wada | H04K 1/006 385/27 |
| 2012/0170891 | A1 * | 7/2012 | Kitoh | G02B 6/2938 385/37 |
| 2017/0063022 | A1 * | 3/2017 | Komljenovic | H04Q 11/0067 |
| 2018/0224603 | A1 * | 8/2018 | Trita | G02B 6/12011 |
| 2020/0355869 | A1 * | 11/2020 | Hajimiri | G02B 6/12019 |
| 2021/0048724 | A1 * | 2/2021 | Bogaerts | G02B 26/10 |
| 2022/0390280 | A1 * | 12/2022 | Pavanello | G01J 3/0259 |

OTHER PUBLICATIONS

Bland-Hawthorn et al., "Astrophotonics: a new era for astronomical instruments," *Optics Express*, Feb. 2, 2009, 17(3): pp. 1880-1884. (5 pages).

Chen et al., "Cost-effective improvement of the performance of AWG-based FBG wavelength interrogation via a cascaded neural network," *Optics Express*, Feb. 28, 2022, 30(5): pp. 7647-7663. (17 pages).

Cvetojevic et al., "Developing arrayed waveguide grating spectrographs for multi-object astronomical spectroscopy," *Optics Express*, Jan. 30, 2012, 20(3): pp. 2062-2072. (11 pages).

Gatkine et al., "Arrayed waveguide grating spectrometers for astronomical applications: new results," *Optics Express*, Jul. 24, 2017, 25(15): pp. 17918-17935. (18 pages).

Gatkine et al., "Astrophotonic Spectrographs," *Applied Sciences*, Jan. 2019, 9(290):app9020290. (18 pages).

Gatkine et al., "Development of high-resolution arrayed waveguide grating spectrometers for astronomical applications: first results," arXiv:1606.02730v1 [astro-ph.IM] [online]. Jun. 8, 2016 [retrieved on Oct. 13, 2023]. Retrieved from the Internet: <URL: https://arxiv.org/abs/1606.02730>. (12 pages).

Gatkine et al., "Potential of commercial SiN MPW platforms for developing mid/high-resolution integrated photonic spectrographs for astronomy," *Applied Optics*, Jul. 1, 2021, 60(19): pp. D15-32. (18 pages).

Gehl et al., "Active phase correction of high resolution silicon photonic arrayed waveguide gratings," *Optics Express*, Mar. 20, 2017, 25(6): pp. 6320-6334. (15 pages).

Goh et al., "Estimation of Waveguide Phase Error in Silica-Based Waveguides," *Journal of Lightwave Technology*, Nov. 1997, 15(11): pp. 2107-2113. (7 pages).

Hong et al., "Ultralow-loss compact silicon photonic waveguide spirals and delay lines," *Photonics Research*, Jan. 2022, 10(1): pp. 1-7. (7 pages).

Hu et al., "Characterization of Low Loss Waveguides Using Bragg Gratings," *IEEE Journal of Selected Topics in Quantum Electronics*, Jul./Aug. 2018, 24(4):6101508. (8 pages).

Hu et al., "Folded 15-channel arrayed waveguide gratings on silicon nitride platform with loop reflector," Optics Communications, 2021 (available online Jul. 24, 2021), 500: 127321. (8 pages).

Hu et al., "Integrated Arbitrary Filter With Spiral Gratings: Design and Characterization," *Journal of Lightwave Technology*, Aug. 15, 2020, 38(16): pp. 4454-4461. (8 pages).

Jiang et al., "Dynamic Phase-Error Compensation for High-Resolution InP Arrayed-Waveguide Grating Using Electro-optic Effect," *21st Annual Meeting of the IEEE Lasers and Electro-Optics Society*, Nov. 9-13, 2008, pp. 53-54. (2 pages).

Kamalakis et al., "An Estimation of Performance Degradation Due to Fabrication Errors in AWGs," *Journal of Lightwave Technology*, Sep. 2002, 20(9): pp. 1779-1787. (9 pages).

Okamoto et al., "Arrayed-waveguide grating multiplexer with flat spectral response," *Optics Letters*, Jan. 1, 1995, 20(1): pp. 43-45. (3 pages).

Okamoto et al., "Fabrication of silicon reflection-type arrayed-waveguide gratings with distributed Bragg reflectors," *Optics Letters*, Sep. 15, 2013, 38(18): pp. 3530-3533. (4 pages).

Smit et al., "PHASAR-Based WDM-Devices: Principles, Design and Applications," *IEEE Journal of Selected Topics in Quantum Electronics*, Jun. 1996, 2(2): pp. 236-250. (15 pages).

Stoll et al., "Performance limits of astronomical arrayed waveguide gratings on a silica platform," *Optics Express*, Dec. 21, 2020, 28(26): pp. 39354-39367. (14 pages).

Subramanian et al., "Silicon and silicon nitride photonic circuits for spectroscopic sensing on-a-chip," *Photonics Research*, Oct. 2015, 3(5): pp. B47-59. (13 pages).

Takada et al., "A 25-GHz-Spaced 1080-Channel Tandem Multi/Demultiplexer Covering the S-, C-, and L-Bands Using an Arrayed-Waveguide Grating With Gaussian Passbands as a Primary Filter," *IEEE Photonics Technology Letters*, May 2002, 14(5): pp. 648-650. (3 pages).

Van Wijk et al., "Compact ultrabroad-bandwidth cascaded arrayed waveguide gratings," *Optics Express*, May 11, 2020, 28(10): pp. 14618-14626. (9 pages).

Yamada et al., "Crosstalk Reduction in a 10-GHz Spacing Arrayed-Waveguide Grating by Phase-Error Compensation," *Journal of Lightwave Technology*, Mar. 1998, 16(3): pp. 364-371. (8 pages).

Zhang et al., "Arrayed Waveguide Grating with Reusable Delay Lines (RDL-AWG) for High Resolving Power, Highly Compact, Photonic Spectrographs," *2022 IEEE Photonics Conference* (*IPC*), Nov. 13-17, 2022. (2 pages).

Zhang et al., "Silicon Nitride Fabry-Perot Bragg Grating Nanoresonator with Ultrahigh Intrinsic Q," *CLEO: Science and Innovations 2022*, May 15- 20, 2022, SM4G.7. (2 pages).

Zhang et al., "Tandem Configuration of Microrings and Arrayed Waveguide Gratings for a High-Resolution and Broadband Stationary Optical Spectrometer at 860 nm," *ACS Photonics*, Apr. 2021, 8: pp. 1251-1257. (7 pages).

Zhang et al., "Ultracompact 40-Channel Arrayed Waveguide Grating on Silicon Nitride Platform at 860 nm," *IEEE Journal of Quantum Electronics*, Feb. 2020, 56(1): 8400308. (8 pages).

Zheng et al., "A Single-Chip Integrated Spectrometer via Tunable Microring Resonator Array," *IEEE Photonics Journal*, Oct. 2019, 11(5):6602809. (9 pages).

Zhu et al., "Ultrabroadband High Coupling Efficiency Fiber-to-Waveguide Coupler Using $Si_3N_4/SiO_2$ Waveguides on Silicon," *IEEE Photonics Journal*, Oct. 2016, 8(5):7102112. (12 pages).

* cited by examiner

-- Background Art --

600

602

604 Power distribution

606 Power/phase look-up $i = 0$ $\frac{\text{Power in the couple}_i}{\text{Power in the bus}_i} \rightarrow L_i$ Update *Power in the bus*$_{i+1}$ $\begin{Bmatrix} \text{phase in the bus}_i \\ L_i \rightarrow \text{phase in the coupler}_i \end{Bmatrix} \rightarrow P_i$ Update *Phase in the bus*$_{i+1}$ $i$ = number of arrayed waveguides?

Y

End

N $i = i + 1$

ARRAYED WAVEGUIDE GRATING WITH REUSABLE DELAY LINE (AWG-RDL)

CROSS-REFERENCE TO RELATED APPLICATIONS

The present application claims the benefit of U.S. Provisional Application No. 63/364,792, filed May 16, 2022, entitled "Arrayed Waveguide Grating with Reusable Delay Lines," and U.S. Provisional Application No. 63/427,674, filed Nov. 23, 2022, entitled "High Resolving Power Arrayed Waveguide Grating with Spiral Reusable Delay Lines," each of which is incorporated by reference herein in its entirety.

STATEMENT REGARDING FEDERALLY SPONSORED RESEARCH

This invention was made with government support under 80NSSC22K1489 awarded by the National Aeronautics and Space Administration and AST1711377 awarded by the National Science Foundation. The government has certain rights in the invention.

FIELD

The present disclosure relates generally to systems with multiple wavelengths of electromagnetic radiation, and more particularly, photonic systems employing arrayed waveguide gratings.

BACKGROUND

Arrayed waveguide gratings (AWG) have been used as wavelength routers, multiwavelength receivers, multiwavelength lasers, wavelength-selective switches, and add-drop multiplexers in optical communications. In addition, AWGs can be employed in on-chip spectral-domain optical coherence tomography, optical sensors, neural networks, quantum computing, and astronomical spectroscopy, among other applications. In conventional AWG systems, an array of separate waveguides extends between input and output free propagation regions, and a path length of each waveguide being different from the path length of an adjacent waveguide in the array by a fixed amount. The length of the longest waveguide in the array is estimated to be proportional to a product of the resolving power (R) and operating wavelength (A). Thus, as the resolving power increases for a fixed operating wavelength, the required footprint for the AWG monotonically increases in order to accommodate the waveguide array. However, as the footprint of the AWG increases, it becomes increasingly difficult to ensure uniformity across the device. For example, fabrication imperfections across the AWG can lead to optical phase errors, which can degrade device performance by reducing resolving power, increasing insertion loss, and/or increasing crosstalk.

Various approaches have been studied to reduce the impact of such phase-error issues, including active phase compensation and footprint reduction. When the number of waveguides in the array exceeds 100, the active phase compensation approach can be expensive and unwieldy, as it requires complex digital circuits and relatively high power consumption. To reduce footprint in conventional systems, the input and output free propagation regions (FPRs) were overlapped, or reflectors were added to the centers of arrayed waveguides (e.g., to reuse one of the FPRs as both input and output regions). In either case, the AWG footprint could only be reduced by a factor of 2.

Embodiments of the disclosed subject matter may address one or more of the above-noted problems and disadvantages, among other things.

SUMMARY

Embodiments of the disclosed subject matter provide arrayed waveguide gratings with reusable delay line (AWG-RDL), and systems and methods for use thereof. In some embodiments, the AWG-RDL employs a single continuous waveguide and a plurality of coupling devices. The coupling devices can be coupled at different locations along the continuous waveguide, thereby re-using the same waveguide to provide different path lengths as well as to introduce accurate power and phase distributions to illuminate an output free propagation region (FPR). In some embodiments, the coupling devices comprise an array of directional couplers, Y-splitters, or multimode interference (MMI) splitter. Unlike conventional AWGs, embodiments of the disclosed subject matter can achieve high resolving powers (e.g., ≥10,000, such as ≥100,000) in a relatively compact footprint (e.g., >70 times more compact than conventional AWGs). Moreover, in some embodiments, the AWG-RDL can operate with a single FPR, e.g., an output FPR when operating in a de-multiplexer configuration or an input FPR when operating in a multiplexer configuration.

In one or more embodiments, an arrayed waveguide grating (AWG) system can have a reusable delay line, a plurality of coupling devices, and a free propagation region (FPR). The delay line can comprise a continuous first waveguide connected to receive input electromagnetic radiation (EMR) having a plurality of wavelengths. Each coupling device can comprise a second waveguide coupled to a respective portion of the continuous first waveguide. The FPR region can have input and output ends. The input end can be coupled to receive the EMR from each of the coupling devices. The EMR can be directed to spatially-separated output channels based on wavelength at the output end. The plurality of coupling devices and delay line can be configured to control power and phase distributions of the EMR transmitted to the FPR.

In one or more embodiments, a method can comprise providing input EMR to a continuous first waveguide of a delay line. The EMR can have a plurality of wavelengths. The method can further comprise transmitting the EMR to an FPR region via a plurality of coupling devices. Each coupling device can comprise a second waveguide coupled to a respective portion of the continuous first waveguide. The FPR region can have an input end and an output end. The input end can be coupled to receive the EMR from each of the coupling devices. The EMR can be directed to spatially-separated output channels based on wavelength at the output end. The method can also comprise collecting the EMR in the spatially-separated output channels via one or more detectors disposed at the output end or an array of waveguides disposed at the output end. The configurations of the plurality of coupling devices and the delay line can control power and phase distributions of the EMR transmitted to the FPR.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

DETAILED DESCRIPTION

General Considerations

Figure 1:
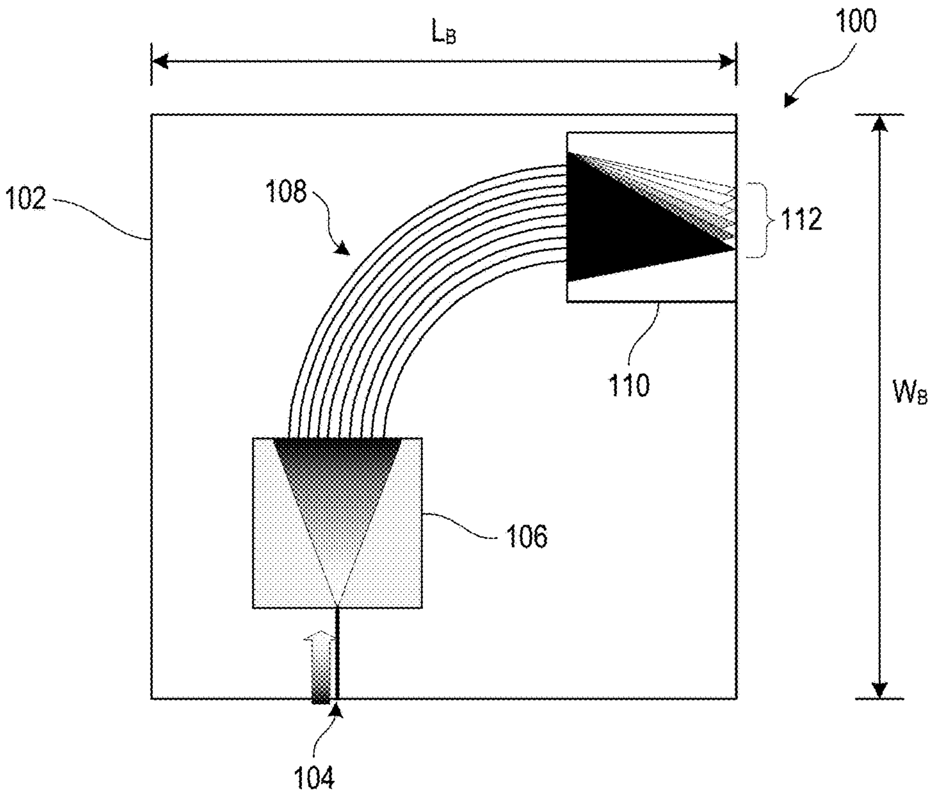
FIG. 1 is a simplified schematic diagram of a photonic chip with a conventional arrayed waveguide grating.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein but are not intended to be limiting. For example, certain terms may be used such as "inner," "outer," "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same.

As used herein, "comprising" means "including," and the singular forms "a" or "an" or "the" include plural references unless the context clearly dictates otherwise. The term "or" refers to a single element of stated alternative elements or a combination of two or more elements unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Introduction

Disclosed herein are arrayed waveguide gratings with reusable delay lines (AWG-RDL), which employ only one waveguide and a plurality of coupling devices that provide accurate power and phase distributions with respect to a single free propagation region (FPR). In some embodiments, an AWG-RDL can achieve a higher resolving power, R (e.g., R≥10,000, such as R≥100,000), in a smaller device footprint as compared to conventional AWGs.

For example, FIG. 1 illustrates a conventional AWG configuration 100, where an array 108 of single mode waveguides of different length are arrayed between an input FPR 106 (e.g., acting as input lens) and an output FPR 110 (e.g., acting as output lens). Multi-wavelength electromagnetic radiation (EMR) (e.g., light having wavelengths in a range of 100 nm to 1 mm, such as, but not limited to, 400-2350 nm, inclusive) can be provided to input 104 of the AWG chip 102, where a single-mode waveguide launches the EMR into the input FPR 106. The input FPR 106 in turn illuminates the array 108 of waveguides, which is constructed to introduce a fixed path difference between adjacent waveguides according to the spectral order. The EMR from the waveguide array 108 is focused by the output FPR 110, with different wavelengths interfering constructively at different spatial locations (e.g., output channels 112) along a focal plane.

The longest waveguide in the array 108 is estimated to be proportional to a product of the operating wavelength and the resolving power, R. The resolving power, R, of AWG 100 can be expressed by:

$$R = \frac{\lambda_0}{\Delta\lambda} \approx m \times N \tag{1}$$

where $\lambda_0$ is the operating wavelength, $\Delta\lambda$ is the spectral full-width half-max (FWHM), m is the spectral order of the AWG, and N is the number of waveguides in the AWG. The array 108 has a path length difference between each successive waveguide equal to:

$$\Delta L = \frac{m\lambda_0}{n_a} \tag{2}$$

The longest waveguide in the arrayed waveguides is about $$\Delta L \times N \approx \frac{m\lambda_0}{n_a} \times \frac{R}{m} = \frac{\lambda_0}{n_a} R.$$

Figure 2A:
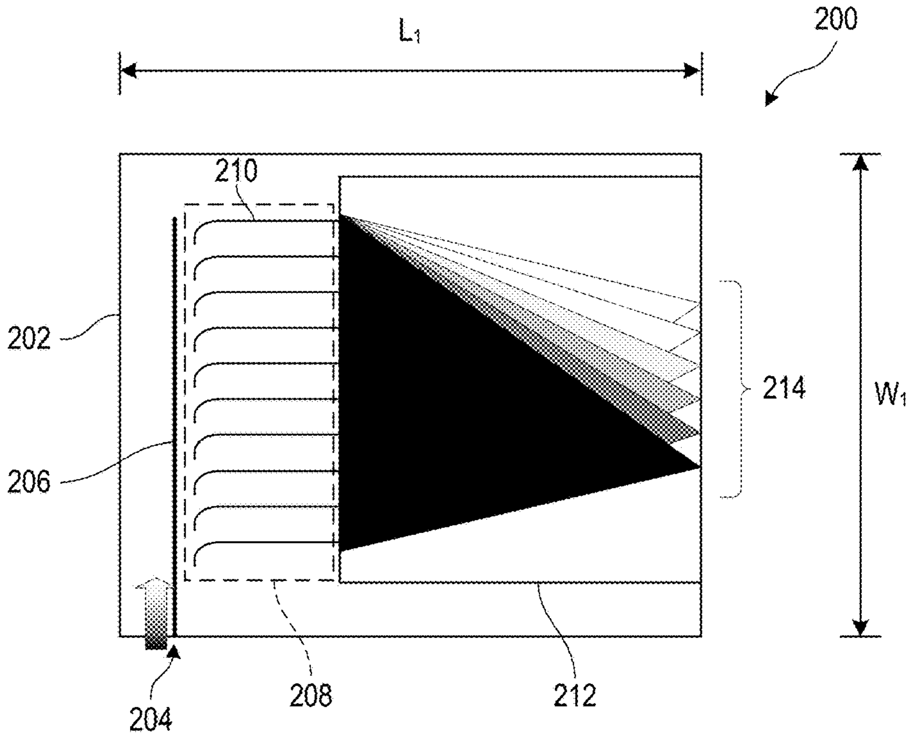
FIG. 2A is a simplified schematic diagram of a photonic chip with an arrayed waveguide grating with a reusable delay line (AWG-RDL), according to one or more embodiments of the disclosed subject matter.

This implies that for a fixed R value, the length of the longest waveguide is fixed regardless of how many waveguides are in the array 108. Thus, as the resolving power increases, so must the optical path length of the arrayed waveguides. Not only does this require an increase in the footprint of the chip 102 (e.g., LB×WB of 32.5 mm×58 mm, or a planar area of 1885 $mm^2$, for R=120,000), but it can also lead to optical phase errors generated by fabrication imperfections In contrast to conventional AWGs that use an array of separate waveguides between two FPRs, embodiments of the disclosed subject matter achieve a significant footprint reduction (e.g., at least a 70-fold reduction as compared to the footprint of conventional AWGs for the same R) by using a plurality of coupling devices with a single waveguide (e.g., reusable delay line) to introduce accurate power and phase distributions to illuminate a single FPR (e.g., output FPR). For example, FIG. 2A illustrates an AWG with reusable delay line (AWG-RDL) 200 on a photonic chip 202. In some embodiments, a high-coupling efficiency fiber-to-waveguide coupler (e.g., butt coupling between an input single-mode fiber and a single-mode high-index-contrast waveguide 206) can provide EMR to input 204 of the photonic chip 202.

Unlike the AWG 100 of FIG. 1, where the phase distribution is introduced by the array 108 of waveguides with different lengths between FPRs 106, 110, the AWG-RDL 200 of FIG. 2A employs a single continuous waveguide 206 (e.g., first waveguide) to provide the phase distribution by an array 208 of coupling devices. In the illustrated example, the array 208 comprises a plurality of separate second waveguides 210, each disposed with respect to a separate portion of the first waveguide 206 and acting as a directional coupler (DCs). By reusing waveguide 206 as the delay line and using the coupling device array 208 to provide the desired power and phase distributions, high resolving power (e.g., R≥10,000, such as R≥100,000) can be achieved in as relatively small footprint (e.g., $L_1 \times W_1$ of 4.2 mm×2.9 mm, or a planar area of 12.18 $mm^2$, for R=120,000; for example, an area less than 12.5 $mm^2$). The compact footprint of AWG-RDL 200 significantly reduces the impact of any fabrication imperfections and uniformity issues, which otherwise limit conventional AWGs from achieving ultra-high resolving powers (e.g., R≥100,000).

The transmitted power and phase of each DC in the array 208 can be controlled by the gap width and the coupling length between the second waveguide 210 and the respective portion of the first waveguide 206. With the capability to fabricate sub-10 nm feature sizes by electron-beam (E-beam) lithography, the array 208 can generate arbitrary power and phase distributions required to illuminate the output FPR 212. For example, in some embodiments, the power and phase distributions generated by the array 208 of AWG-RDL 200 can be the same as that in conventional AWG 100. Alternatively, in some embodiments, the power and phase distributions can be arbitrarily generated by the array 208 of AWG-RDL 200, for example, such that output spectrum 214 can be altered to have any desired peak profile. Indeed, unlike conventional AWGs, the AWG-RDL architecture offers an easy way to achieve non-standard power distribution (or illumination) by simply optimizing each DC separately to couple a precise fraction of power in the outgoing waveguide. For example, the peak profiles in the output spectrum can have a Gaussian shape, a flat-top shape, or any other desired shape.

Arrayed Waveguide Grating Devices and Systems

The AWG-RDL architecture disclosed herein can be used in a variety of systems that involve and/or process multiple wavelengths of electromagnetic radiation (EMR) (e.g., wavelengths in the range of 100 nm to 1 mm, inclusive, including the UV spectrum (100-400 nm), visible spectrum (400-800 nm), and infrared spectrum (800 nm-1 mm)). In some embodiments, the AWG-RDL may be provided on a separate chip or die (e.g., photonic chip) and combined with other components (e.g., at a board-level) to form an EMR processing system. Alternatively, in some embodiments, the AWG-RDL may be integrally formed together with other components on a common substrate to form the EMR processing system.

Figure 2B:
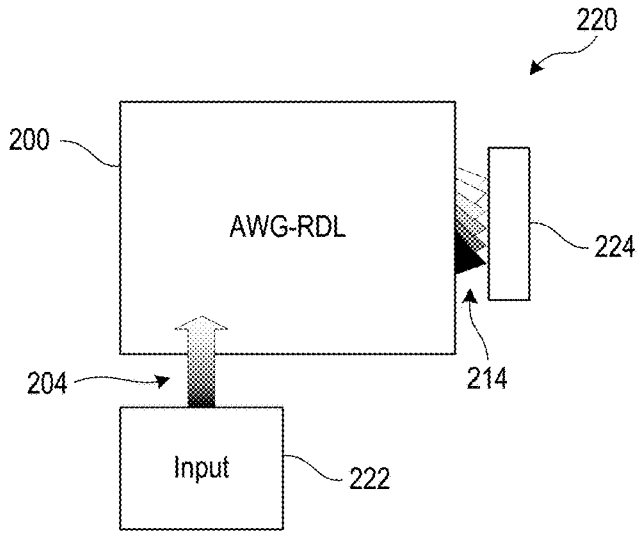
FIG. 2B is a simplified schematic diagram of a demultiplexer configuration employing an AWG-RDL and one or more detectors, according to one or more embodiments of the disclosed subject matter.
Figure 2C:
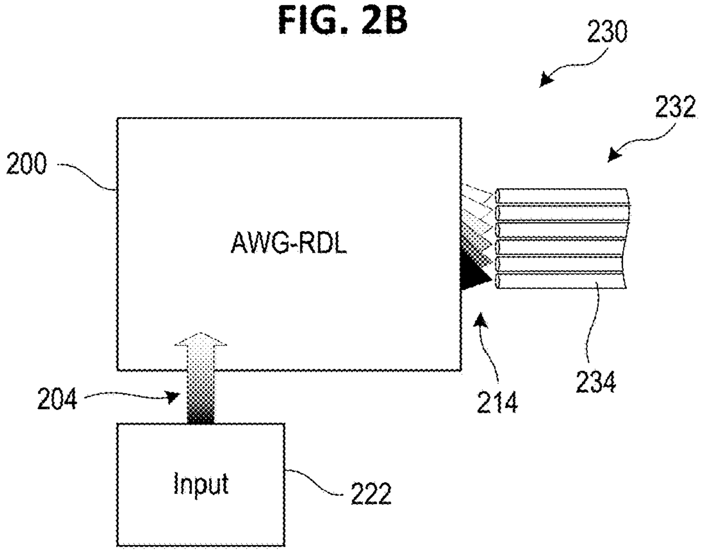
FIG. 2C is a simplified schematic diagram of a demultiplexer configuration employing an AWG-RDL and an output waveguide array, according to one or more embodiments of the disclosed subject matter.

In some embodiments, one or more AWG-RDLs can be used as part of an EMR processing system to provide de-multiplexing. For example, FIG. 2B illustrates an exemplary de-multiplexer configuration 220. AWG-RDL 200 can receive EMR at input 204 from an input system 222, such as but not limited to an optical communication system, an optical sensing system, an optical coherence tomography system, a neural network system, a quantum computing system, or an astrophotonic spectrographic system. As described above, the AWG-RDL 200 can spatially separate the EMR from input 204 into multiple output channels 214, which may be detected by one or more detectors 224 positioned to receive the spatially-separated EMR. In some embodiments, the one or more detectors 224 can comprise a one-dimensional (e.g., linear) or two-dimensional array of pixels. For example, the one or more detectors 224 can be a complementary metal-oxide semiconductor (CMOS) imager or charge-coupled device (CCD) imager. Alternatively, in some embodiments, the output channels from the AWG-RDL 200 can be directed to a one-dimensional (e.g., linear) or two-dimensional array 232 of collection waveguides 234 (e.g., single-mode optical fibers), for example, as shown in the de-multiplexer configuration 230 of FIG. 2C.

Figure 2D:
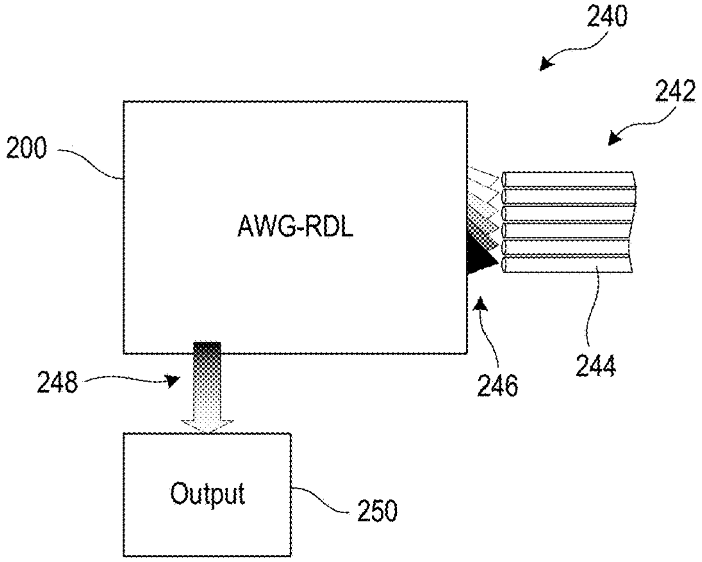
FIG. 2D is a simplified schematic diagram of a multiplexer configuration employing an AWG-RDL and an input waveguide array, according to one or more embodiments of the disclosed subject matter.

In some embodiments, one or more AWG-RDLs can be used as part of an EMR processing system to provide multiplexing. For example, FIG. 2D illustrates an exemplary multiplexer configuration 240. At input channels 246, AWG-RDL 200 can receive EMR having different wavelengths from an input array 242 of input waveguides 244 (e.g., single-mode optical fibers). The AWG-RDL 200 can combine the spatially-separated EMR of different wavelengths into a single output 248, which in turn may be directed to an output system 250. For example, the output system can be, but is not limited to, an optical communication system. In some embodiments, the multiplexer configuration of AWG-RDL 200 may be substantially the same as the de-multiplexer configuration, but simply operated in reverse. Alternatively, in some embodiments, aspects of the array of the coupling devices (e.g., coupling length, gap, etc.) for the AWG-RDL in the de-multiplexer configuration may need to be adjusted in order to operate as a multiplexer.

Directional Coupler Configurations

In some embodiments, an AWG-RDL 300 can employ an array of directional couplers 306 (DCs) to repetitively tap a single continuous input waveguide 302 (i.e., bus), thereby re-using the input waveguide 302 to provide different optical path lengths (e.g., optical path difference of ΔL). In the illustrated example of FIG. 3A, each directional coupler 306 is formed by a separate second waveguide 308 extending between the FPR 310 at one end and spaced from the input waveguide 302 at an opposite end. The second waveguide 308 can have a bend 312 as it approaches the input waveguide 302, for example, to define coupling length, $L_n$, spaced from the input waveguide 302 by a substantially constant gap, g. The power and phase distributions of the EMR provided to the free propagation region (FPR) 310 can be controlled by appropriate selection of the (i) coupler spacing, g, (ii) coupling length $L_n$, and (iii) coupling position $P_n$. Each directional coupler 306 together with the respective portion of the input waveguide 302 forming the optical path difference ΔL may be considered a delay unit 304 (e.g., three delay units 304*a*-304*c* illustrated in FIG. 3A, although other numbers are also possible). In some embodiments, the configuration of the bend 312 (e.g., bending radius) can be substantially the same across the different delay units 304, for example, to ensure accurate power and phase implementations.

Figure 3A:
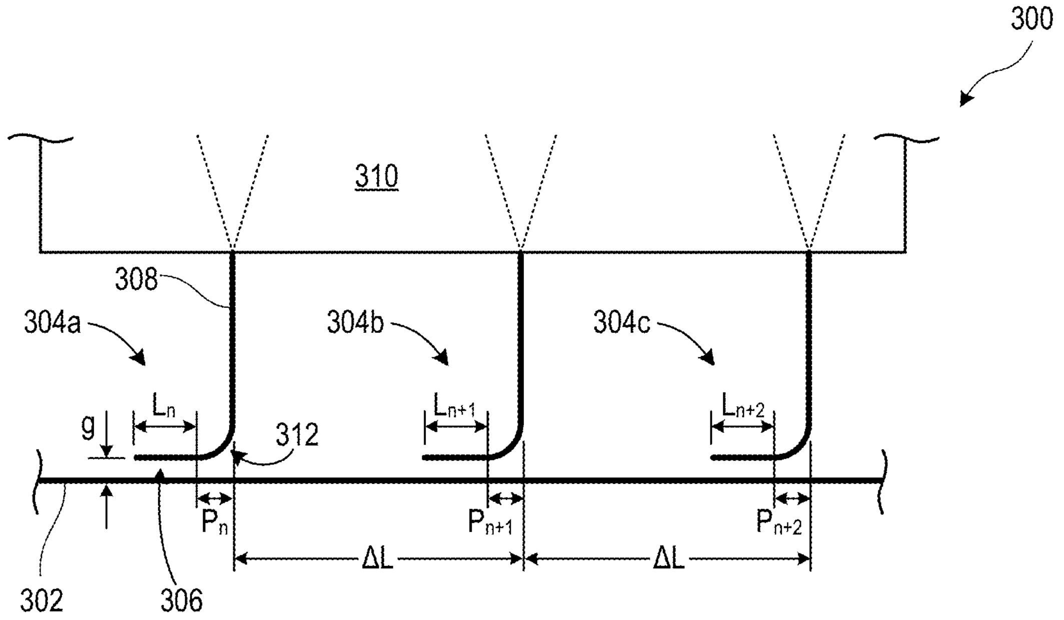
FIG. 3A is a simplified schematic diagram of a first configuration for an AWG-RDL with directional couplers, according to one or more embodiments of the disclosed subject matter.
Figure 3B:
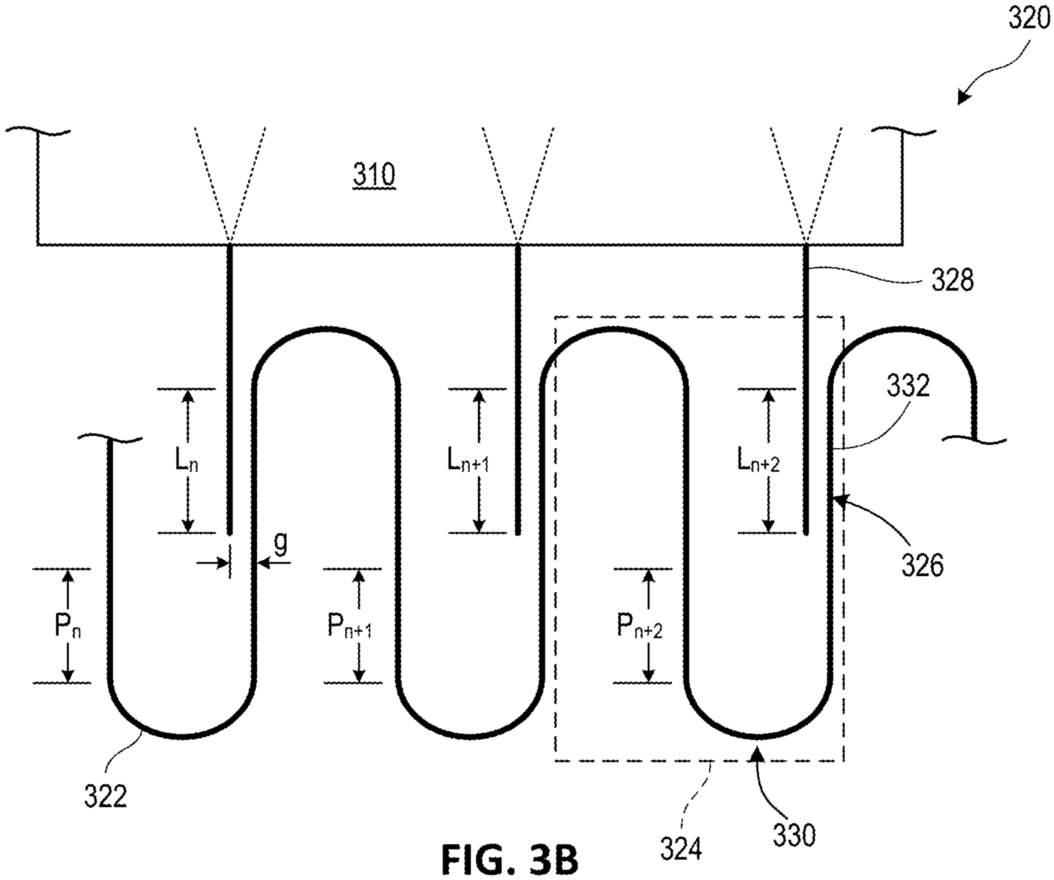
FIG. 3B is a simplified schematic diagram of a second configuration for an AWG-RDL with directional couplers, according to one or more embodiments of the disclosed subject matter.

In the illustrated example of FIG. 3A, the input waveguide 302 has a substantially straight configuration (e.g., linear) and each second waveguide 308 has a bent configuration (e.g., J-shaped or truncated hook shaped). Alternatively, in some embodiments, the input waveguide can have a bent configuration, for example, to further reduce the footprint of the device. In such embodiments, each second waveguide can have a bent or straight configuration. For example, FIG. 3B illustrates an AWG-RDL 320 employing a serpentine configuration for the input waveguide 322. Each directional coupler 326 is formed by a separate second waveguide 328 that extends from FPR 310 at one end and spaced from a facing portion of the input waveguide 322 at an opposite end. The second waveguide 328 can have a substantially straight configuration and can define a coupling length, $L_n$, where the second waveguide 328 is spaced from a substantially straight portion 332 of the input waveguide 322 by a substantially constant gap, g. Again, each directional coupler 326 together with the respective portion of the input waveguide 322 forming the optical path difference (only the extra path length, $P_n$, being labeled in FIG. 3B for clarity) may be considered a delay unit 324 (only one of which is labeled in FIG. 3B for clarity). In some embodiments, the configuration of bends 330 (e.g., bending radius) can be substantially the same across the different delay units 324, for example, to ensure accurate power and phase implementations.

Figure 3C:
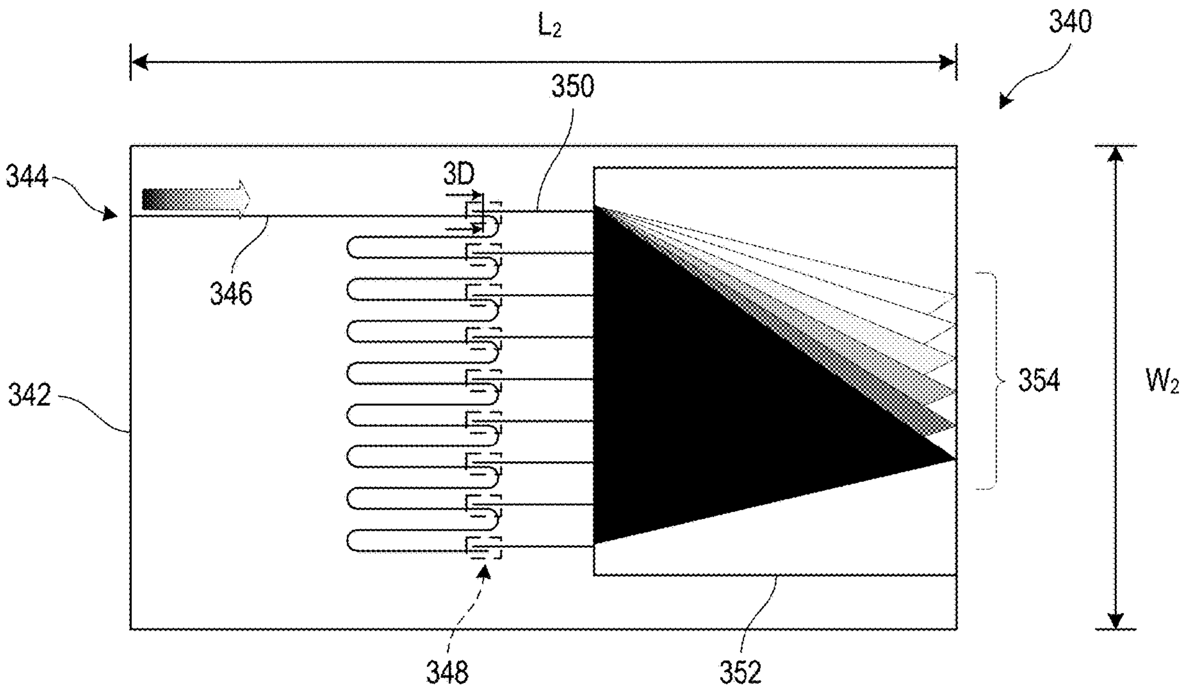
FIG. 3C is a simplified schematic diagram of a photonic chip with the AWG-RDL configuration of FIG. 3B, according to one or more embodiments of the disclosed subject matter.

FIG. 3C illustrates an AWG-RDL 340 employing the configuration of FIG. 3B on a photonic chip 342. EMR having multiple wavelengths can be provided to input 344 of the photonic chip 342. A continuous waveguide 346 conveys the EMR from the input 344 via a substantially-straight section to a serpentine section (e.g., with straight portions in the coupling region), where the waveguide 346 is tapped by an array of directional couplers 348 to act as a reusable delay line, as described above. Each second waveguide 350 of the directional coupler provides the tapped EMR to the FPR 352 to generate the spatially-separated output channels 354. The use of a serpentine configuration for at least some of the input waveguide 346 can allow the photonic chip to have a reduced planar area while still providing a relatively high resolving power (e.g., $L_2 \times W_2 \leq 4.2$ mm×2.9 mm for R~120,000).

Figure 3D:
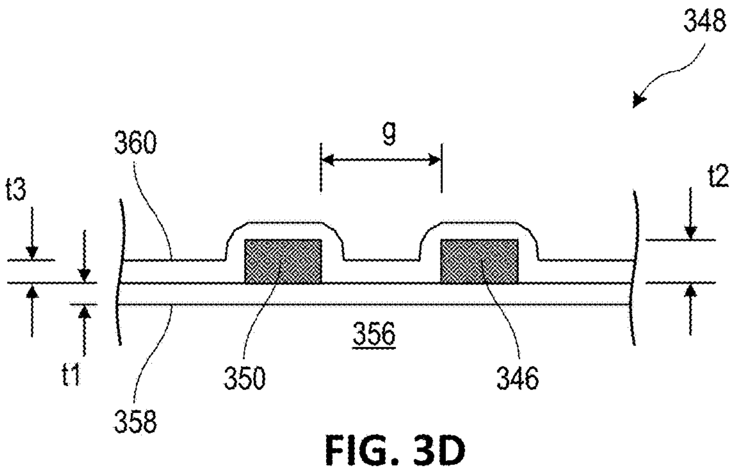
FIG. 3D is a cross-sectional view of one of the directional couplers in the photonic chip of FIG. 3C.

In some embodiments, the structures forming the input waveguide and the directional couplers can be substantially co-planar (e.g., cores in a same layer, for example, parallel to a front side of a substrate or wafer over which the layer is formed). For example, FIG. 3D shows a cross-sectional view of the directional coupler 348 of FIG. 3C illustrating such a co-planar configuration. In the illustrated example, the input waveguide 346 (e.g., the core structure) and the second waveguide 350 (e.g., the core structure) are provided in a same layer over a substrate 356, such that gap, g, of the directional coupler is along a direction substantially parallel to a top surface of substrate 356). Each of the waveguides 346, 350 can be separated from the substrate 356 by an intervening layer acting as a bottom cladding layer 358, while upper and side surfaces of the waveguides 346 can be covered by a top cladding layer 360.

In some embodiments, the AWG-RDL can be formed on a silicon photonic platform, for example, employing silicon nitride planar waveguides (e.g., $Si_3N_4$ core layers with $SiO_2$ cladding layers). For example, in FIG. 3D, bottom cladding layer 358 can be an $SiO_2$ layer (e.g., formed via thermal oxidation) on a silicon substrate 356 and having a thickness $t_1$ of about 10 μm, each core of waveguides 346, 350 can be $Si_3N_4$ layer portions (e.g., formed via low-pressure chemical vapor deposition (LPCVD) and subsequently patterned) having a thickness $t_2$ of about 40-1000 nm (e.g., 300-800 nm, inclusive), and top cladding layer 360 can be another $SiO_2$ layer (e.g., formed via plasma-enhanced chemical vapor deposition (PECVD)) having a thickness $t_3$ of about 3 μm. Accordingly, it should be apparent that the cross-section of FIG. 3D has not been drawn to scale; rather, the sizes of the waveguides 346, 350 have been increased for ease of visualization. In practical embodiments, the thickness $t_2$ of the waveguides and/or the gap, g, may be much smaller (e.g., an order of magnitude) than the thicknesses $t_1$, $t_3$ of the cladding layers.

Such silicon nitride waveguides can provide low optical losses, transparency over a wide wavelength range (400-2350 nm), compatibility with CMOS and wafer-scale foundry processes, and high-power handling capabilities. Moreover, in contrast to silicon, silicon nitride is not limited by two-photon absorption or free-carrier absorption at high powers, while still having a high index contrast (e.g., ~0.5) that allows for compact devices. However, other materials for the substrate, core layer portions, and/or cladding layers are also possible according to one or more contemplated embodiments. Indeed, other materials and/or loss photonic integration platforms can include but are not limited to glass, Si, III-V semiconductors (e.g., AlGaAs, InGaAsP, GaAlInN, etc.), $LiNbO_3$, and SiC.

Figure 3E:
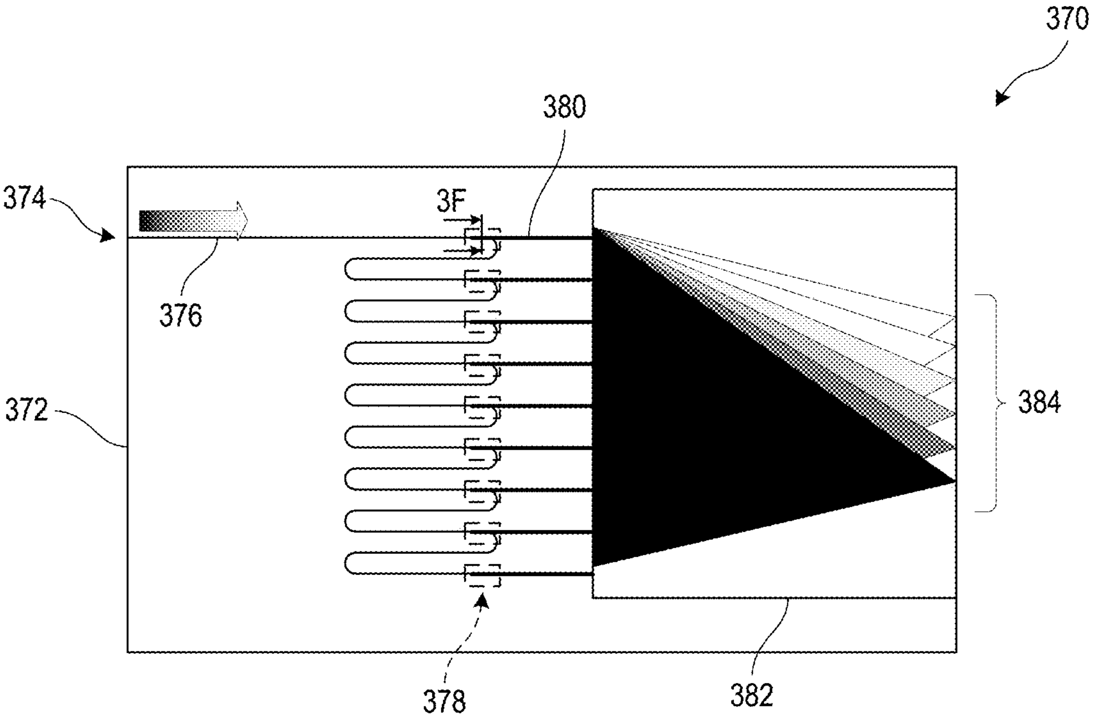
FIG. 3E is a simplified schematic diagram of a photonic chip with a non-planar AWG-RDL configuration, according to one or more embodiments of the disclosed subject matter.
Figure 3F:
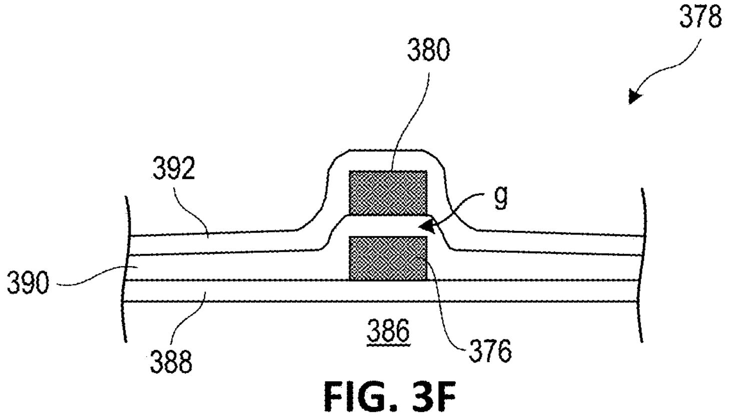
FIG. 3F is a cross-sectional view of one of the directional couplers in the photonic chip of FIG. 3E.

In some embodiments, the structures forming the input waveguide and the directional couplers can be non-planar (e.g., cores in different layers, each layer being parallel to the front side of the substrate or wafer). For example, FIGS. 3E-3F show an exemplary configuration of an AWG-RDL 370 employing a non-planar (e.g., vertical) configuration on a photonic chip 372. Similar to the configuration of FIG. 3C, a continuous waveguide 376 conveys EMR from input 374 via a substantially-straight section to a serpentine section, where the waveguide 376 is tapped by an array of directional couplers 378 to act as a reusable delay line. Each second waveguide 380 of the directional coupler overlaps with a respective portion of the input waveguide 376 in plan view (e.g., as shown in FIG. 3E), such that gap, g, of the directional coupler is along a direction substantially perpendicular to a top surface of substrate 386 (e.g., as shown in the cross-sectional view of FIG. 3F).

Each second waveguide 380 of the directional coupler provides the tapped EMR to the FPR 382 to generate the spatially-separate output channels 384.

In the illustrated example of FIG. 3F, the input waveguide 376 (e.g., the core structure) can be separated from substrate 386 by an intervening layer (e.g., $SiO_2$) acting as a bottom cladding layer 388, the second waveguide 380 (e.g., the core structure) can be separated from the input waveguide 376 by another intervening layer (e.g., $SiO_2$) acting as a middle cladding layer 390, and upper and side surfaces of the second waveguide 380 can be covered by a top cladding layer 392 (e.g., $SiO_2$). Alternatively, in some embodiments, the vertical locations of the input waveguide 376 and the second waveguide 380 can be switched, for example, with the second waveguide 380 between bottom cladding layer 388 and middle cladding layer 390. In some embodiments, the thickness of the middle cladding layer 390 can define the size of the coupling gap, g. The use of such a nonplanar configuration can allow the photonic chip to have an even smaller planar area.

Delay Unit Configurations

In some embodiments, the delay line (e.g., the portion of the input waveguide) can be treated as a separate design unit between adjacent DCs, referred to herein as a delay unit. The delay unit can be flexible in terms of the optical path length and can have fixed locations of input and output ports or sections (e.g., between DCs), which can make the AWG-RDL easier to scale to higher resolving power (e.g., with longer delay units), to wider bandwidths, and/or more output channels (e.g., with larger number of DCs). The optical path length of the delay line, as well as the coupling gap width and coupling length of the DC, can be selected to match desired power and phase distributions. To accommodate the different optical path lengths while maintaining a predetermined size of the delay unit (e.g., to ensure the fixed location of the input and output sections), the portion of the input waveguide within the delay unit may have multiple curves or bends, for example, such that it is curved over a majority of its length within the delay unit.

Figure 4A:
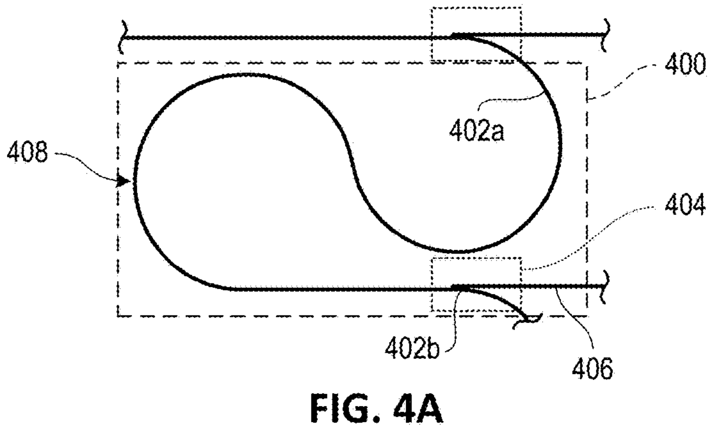
FIG. 4A is a simplified schematic diagram of an exemplary unit cell with directional coupler and curved delay line portion for use in an AWG-RDL, according to one or more embodiments of the disclosed subject matter.

For example, FIG. 4A illustrates a fixed-size delay unit 400 that can be arrayed together for use in an AWG-RDL. Since it is desirable to keep the size of the delay unit 400 fixed across the AWG-RDL despite the different delays between adjacent delay units, the length of the input waveguide within each delay unit 400 can be varied by adopting a curved configuration. For example, the input waveguide within each delay unit 400 can include a delay portion 402*a*, which may have a plurality of curves or bends 408 therein, and a coupling portion 402*b*, which faces a second waveguide 406 to form directional coupler 404. In some embodiments, the coupling portion 402*b* and/or the facing portion of the second waveguide 406 can be substantially straight, as shown in the illustrated example of FIG. 4A. Alternatively or additionally, in some embodiments, the coupling portion 402*b* and/or the second waveguide 406 can also have a curved configuration.

As noted elsewhere herein, AWG-RDLs with higher R values may be susceptible to phase errors due to the larger footprint, which may be similar to the performance degradation of conventional AWGs when the resolving power is larger than 10,000. For higher-R designs (e.g., approaching 100,000 or more), a delay line that fits in a more compact area can avoid, or at least reduce, these phase error issues. In some embodiments, the delay line can be curved or bent to fit into a smaller space, for example, by employing a smaller bending radius. As noted above the AWG-RDLs were fabricated on a 300-nm thick $Si_3N_4$ core layer, which provides a lower bending loss compared to other waveguide geometries that have relatively lower confinement factors. This in turn makes it possible to design AWG-RDLs with smaller footprints that are less susceptible to fabrication variations. To further reduce the minimum bending radii, a thicker $Si_3N_4$ core layer can be used. For example, 800-nm thick $Si_3N_4$ core layer may allow the minimum bending radii to be reduced to 10-20 μm (from 60-75 μm for 300-nm thick $Si_3N_4$ core). Alternatively or additionally, materials other than silicon nitride can be employed for the core layer to enable even smaller bending radii, for example, lithium niobate.

Figure 4B:
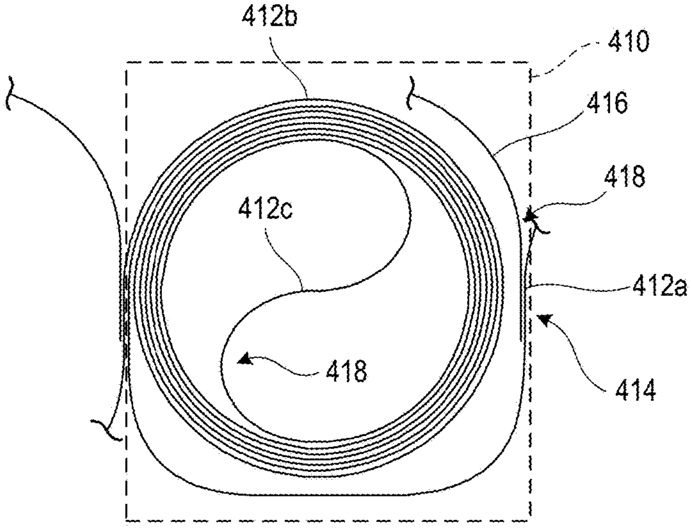
FIG. 4B is a simplified schematic diagram of another exemplary unit cell with directional coupler and spiral delay line portion for use in an AWG-RDL, according to one or more embodiments of the disclosed subject matter.

Alternatively or additionally, in some embodiments, delay line within each delay unit can have a spiral configuration. The compact footprint offered by such a spiral configuration can enhance the ability of AWG-RDLs to achieve ultra-high resolving power (e.g., R≥100,000). For example, FIG. 4B illustrates a fixed-size delay unit 410 that can be arrayed together for use in an AWG-RDL. To accommodate the desired different lengths for the input waveguide within each delay unit 410, the input waveguide has a spiral configuration for delay portion 412*b*. A coupling portion 412*a* can face second waveguide 416 to form directional coupler 414. In some embodiments, to minimize or at least reduce the loss of each spiral unit, an S-shape Euler bend portion 412*c* can be provided (e.g., at a midpoint of the input waveguide portion between the input port of the delay unit 410 and an output port of the delay unit 410), for example, to reduce the mode mismatch in the central region of the spiral and avoid higher-order mode excitations. As with the other examples described herein, the coupling gap width and coupling length of each directional coupler 414 can be optimized to match a desired power and phase distribution. In addition, within the coupling region, each directional coupler 414 can have a substantially identical bending curvature 418, for example, to deliver accurate power and phase.

Figure 4C:
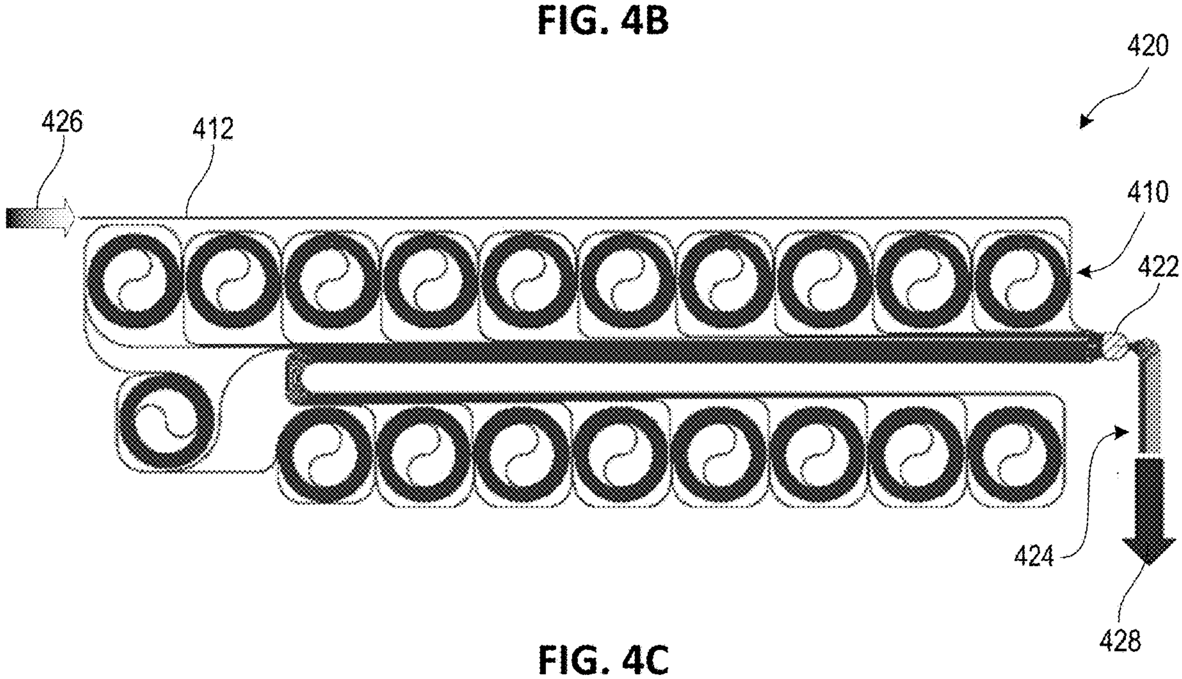
FIG. 4C is a simplified schematic diagram of an AWG-RDL configuration employing an array of the unit cells of FIG. 4B, according to one or more embodiments of the disclosed subject matter.

FIG. 4C illustrates an exemplary configuration for AWG-RDL 420 employing an array of the delay units 410 of FIG. 4B. In particular, 19 delay units 410 were used, with each unit offering a delay line length of 10.9 mm. In total, the AWG-RDL 420 provides 20 arrayed waveguides to the output FPR 422. The spiral delay lines are separated from the adjacent DCs, as shown in FIG. 4B. The delay unit can isolate the design of the entire delay line and can simplify the calculation of the optical path length difference (ΔL) between arrayed waveguides. The delay unit is thus flexible in terms of the optical path length and has fixed locations of its input and output, which makes the AWG-RDL 420 easier to scale to higher resolving powers (e.g., with longer spiral units). Although configuration of FIG. 4C may offer a limited free spectral range (FSR), the FSR can be improved by simply increasing the number of delay units.

Splitter Configurations

Figure 5A:
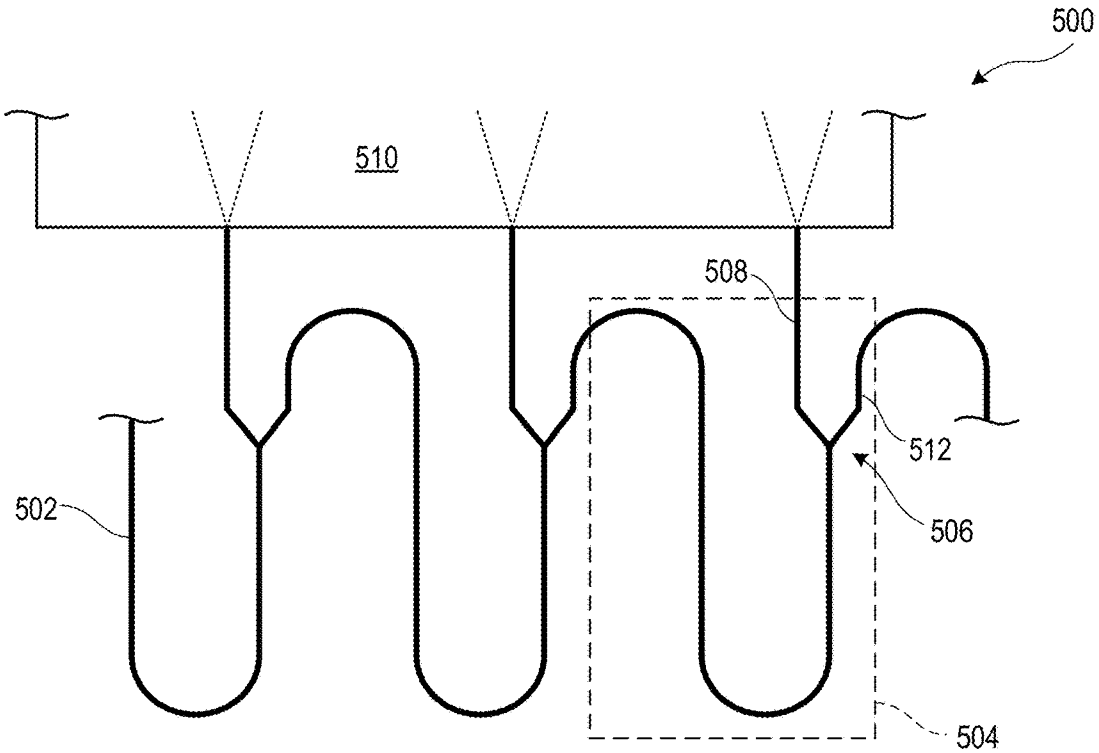
FIG. 5A is a simplified schematic diagram of a configuration for an AWG-RDL with Y-splitters, according to one or more embodiments of the disclosed subject matter.

While the description above and elsewhere herein is focused on the use of an array of directional couplers to repetitively tap the input waveguide, embodiments of the disclosed subject matter. Rather, in some embodiments, an appropriately designed optical splitter can be employed as a coupling device, instead of (or in addition to) directional couplers, to provide a similar effect. For example, FIG. 5A illustrates a configuration for an AWG-RDL 500 employing an array of Y-splitters 506 coupled to a first waveguide 502, thereby re-using the first waveguide 502 to provide different optical path lengths. Each Y-splitter 506, together with the respective portion of the first waveguide 502, may be considered a delay unit 504 (only one of which is labeled in FIG. 5A for clarity). In the illustrated example of FIG. 5A, each Y-splitter 506 is formed by first waveguide 502 branching from a juncture into separate output waveguide portions, with one output waveguide portion 508 extending between FPR 510 at one end and the junction at the other end, and another output waveguide portion 512 extending from the juncture and serving as the continuation of first waveguide 502 input to the next delay unit 504.

Figure 5B:
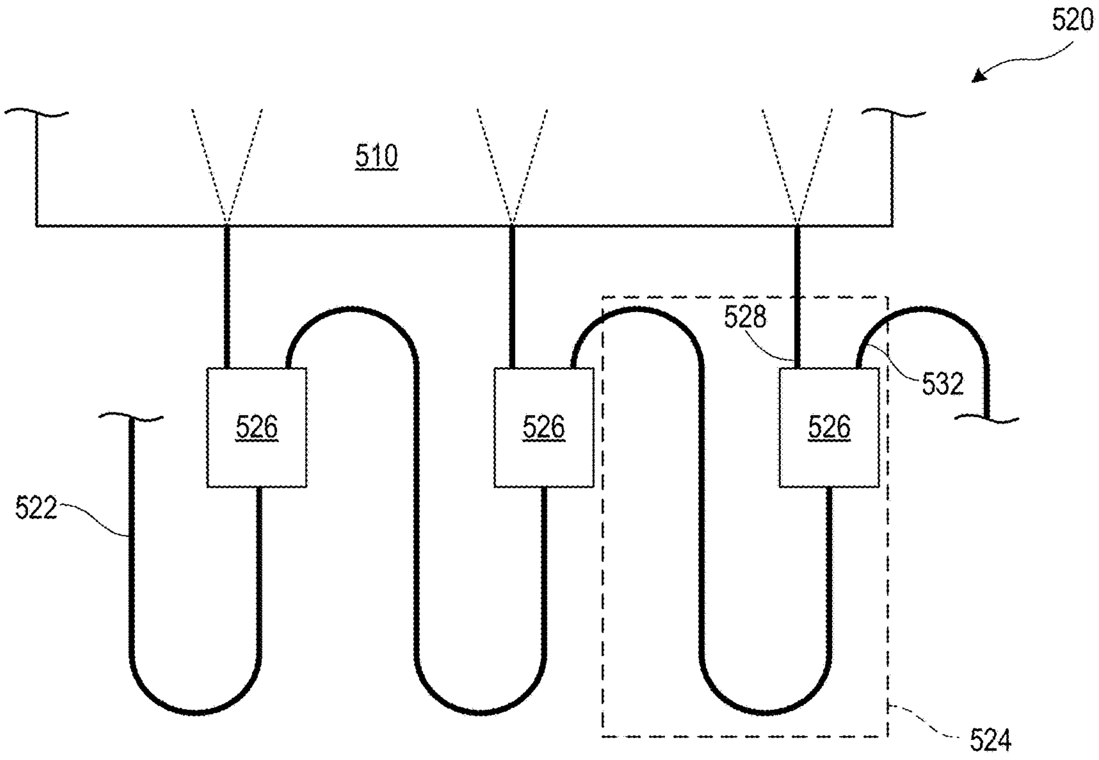
FIG. 5B is a simplified schematic diagram of a configuration for an AWG-RDL with multi-mode interferometry (MMI) splitters, according to one or more embodiments of the disclosed subject matter.

FIG. 5B illustrates another configuration for an AWG-RDL 520 employing an array of multi-mode interferometer (MMI) splitters 526 coupled to a first waveguide 522, thereby re-using the first waveguide 522 to provide different optical path lengths. Each MMI splitter 526, together with the respective portion of the first waveguide 522, may be considered a delay unit 524 (only one of which is labeled in FIG. 5B for clarity). In some embodiments, the configuration of the MMI splitter 526 in each delay unit 524 can be selected to provide desired power and phase distributions to the FPR 510. In the illustrated example of FIG. 5B, a second waveguide 528 can extend from one output of the MMI splitter 526 to the FPR 510, while a third waveguide 532 extending from the other output of the MMI splitter 526 can serve as the continuation of first waveguide 522 input to the next delay unit 524.

Fabricated Examples and Experimental Results

Exemplary Directional Coupler Design

Figure 6A:
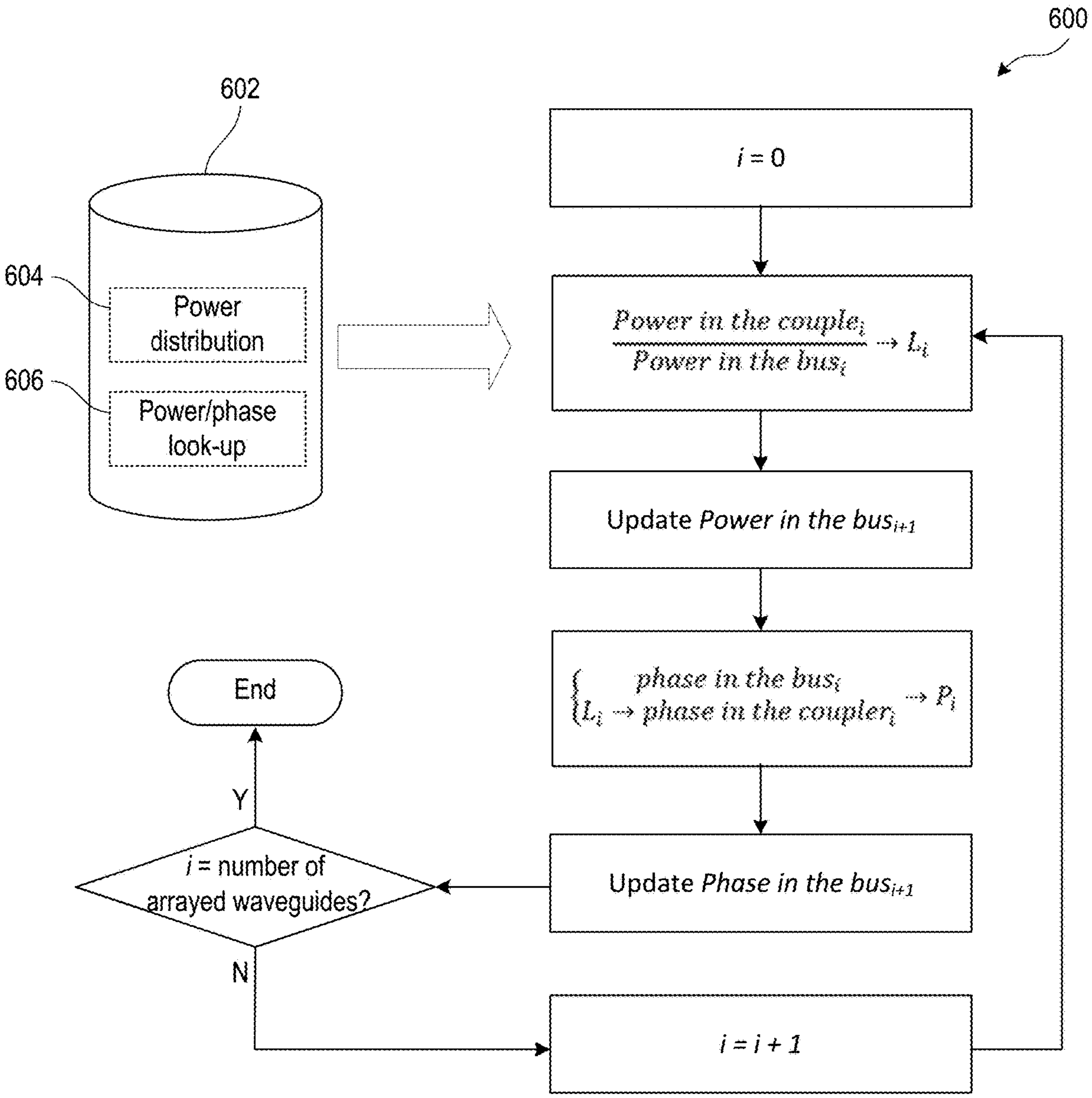
FIG. 6A shows a flowchart for an exemplary calculation of directional coupler array position, P, and length, L, according to one or more embodiments of the disclosed subject matter.
Figure 6B:
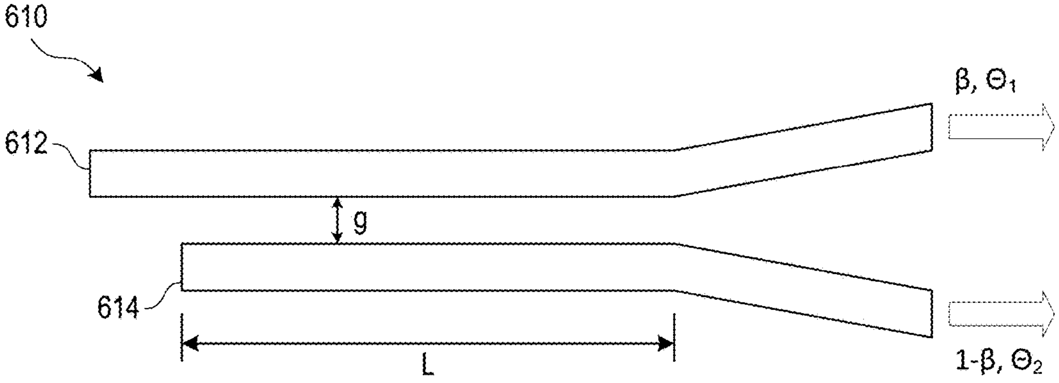
FIG. 6B illustrates simulated power and phase in an individual directional coupler in an AWG-RDL, according to one or more embodiments of the disclosed subject matter.

An exemplary process 600 for designing the embedded array of DCs is shown in FIG. 6A. The purpose of the arrayed DCs is to generate the power and phase distributions that feed into the FPR, for example, as shown in FIG. 3C. For proof of concept, the power and phase distributions are the same as those of the output FPR in a conventional AWG, for example, as shown in FIG. 1; however, other power and phase distributions are also possible according to one or more contemplated embodiments. A conventional AWG was simulated by Rsoft (sold by Synopsys®, Mountain View, California) to get proper phase distribution. The power distribution was simply a Gaussian distribution, while the phase distribution can be treated as an array of 0's at the central wavelength, $\lambda_0$. For the other wavelengths, the phase was a linear distribution depending on the grating orders. The power and phase look-up table 606 of the DCs was simulated by the Beam Propagation Method in Rsoft, and further modified by experimental data. The look-up table 606 contained the values of $\beta$, $\theta_1$, and $\theta_2$ for different coupling lengths, L, between first waveguide or bus 612 (e.g., forming the reusable delay line) and second waveguide 614 (e.g., forming the coupler of the DC), as shown in FIG. 6B. $\beta$ represents the remaining power coefficient, $\theta_1$ represents the extra phase introduced in the bus 612 of the DC 610, and $\theta_2$ is the extra phase introduced in the coupler 614 of the DC.

In this work, the gap width, g, of the DC 610 was set to 0.6 μm. Then, the two databases 604, 606 (e.g., stored separately or in a common database 602) were used to calculate the lists of coupler length L and extra path P as shown in the process flow of FIG. 6A, where the extra path P was used to correct the phase distribution caused by $\theta_1$ and $\theta_2$. The optical path difference $\Delta L$ was set by the grating order m ($\Delta L = m\times\lambda_0$), which is directly related to the resolving power (R) by $R \approx m\times N$, where N is the number of waveguides in the coupling device array. After the calculation of the L and P lists, to change the R value, the only parameter that needs to be changed is $\Delta L$. This makes the design process simple and fast. In addition, by adjusting both the phase and the power distributions of the light in the waveguides, different profiles can be generated. For example, a flat-top transmission profile for each of the output channels can be achieved by altering the power distribution.

Figure 6C:
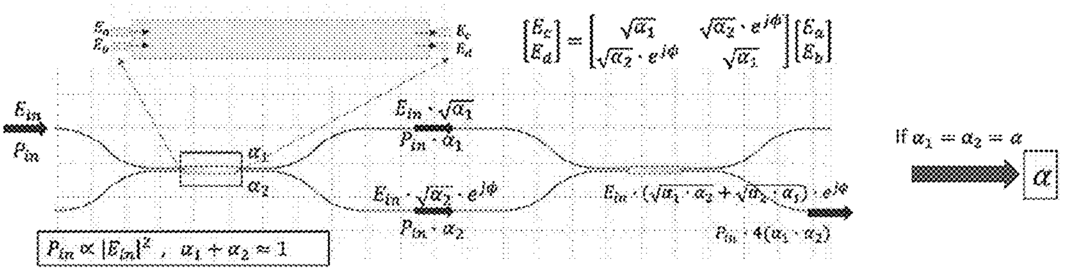
FIG. 6C shows a baseline configuration using a Mach-Zehnder interferometer (MZI) to extract one or more operational parameters.
Figure 6D:
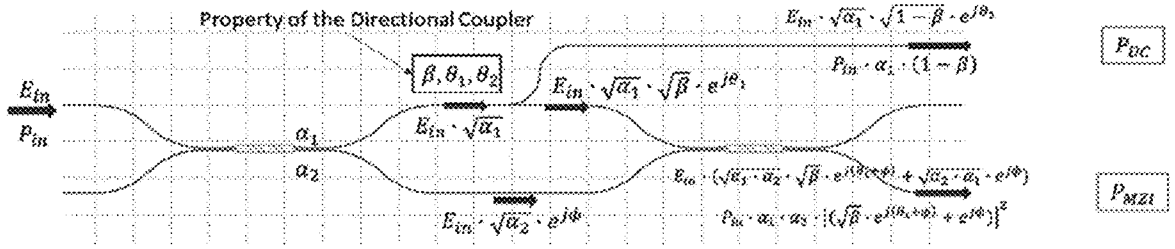
FIG. 6D shows a test configuration using a directional coupler added to an upper arm of the MZI of FIG. 6C.

A model was established to accurately measure the parameters $\beta$, $\theta_1$, and $\theta_2$ based on the Mach-Zehnder interferometer (MZI), as shown in FIG. 6C. The MZI with two identical 2×2 multi-mode interferometers (MMIs) was selected as a baseline structure to extract the $\alpha$ that is the property of the MMIs. It also works as a reference to eliminate any extra losses, such as, but not limited to, propagation loss, fiber-waveguide coupling loss, etc. In FIG. 6D, one directional coupler with coupling length L is added to the upper arm of the MZI of FIG. 6C, while the remainder of structure of FIG. 6D is the same as the baseline structure of FIG. 6C. This can ensure that there are no extra phase or power disturbances in the MZI. By measuring the output power $P_{DC}$, the value of $\beta$ can be extracted based on:

$$P_{DC} = P_{in}\alpha_1\cdot(1-\beta). \quad (3)$$

Figure 6E:
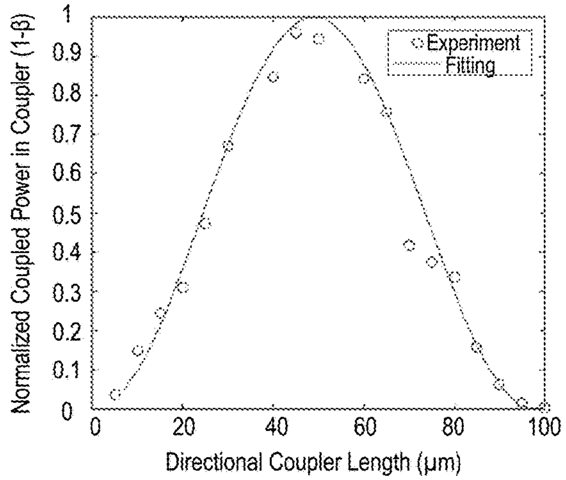
FIG. 6E is a graph of normalized power in the directional coupler ($1-\beta$) versus length of the directional coupler for the configuration of FIG. 6D.

FIG. 6E shows the extracted $1-\beta$ as a function of coupler length L. Then, $\theta_1$ can be evaluated for a measured $P_{MZI}$, based on:

$$P_{MZI} = P_{in}\cdot\alpha_1\cdot\alpha_2\cdot|(\sqrt{\beta}\cdot e^{j(\theta_1+\phi)}+e^{j\phi})|^2. \quad (4)$$

Figure 6F:
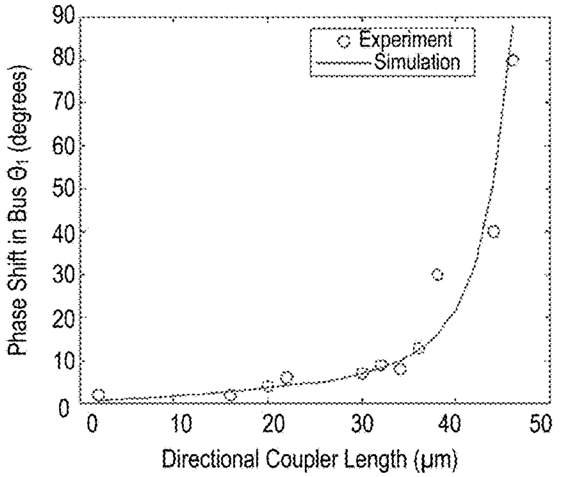
FIG. 6F is a graph of phase shift in the bus ($\theta_1$) versus length of the directional coupler for the configuration of FIG. 6D.
Figure 6G:
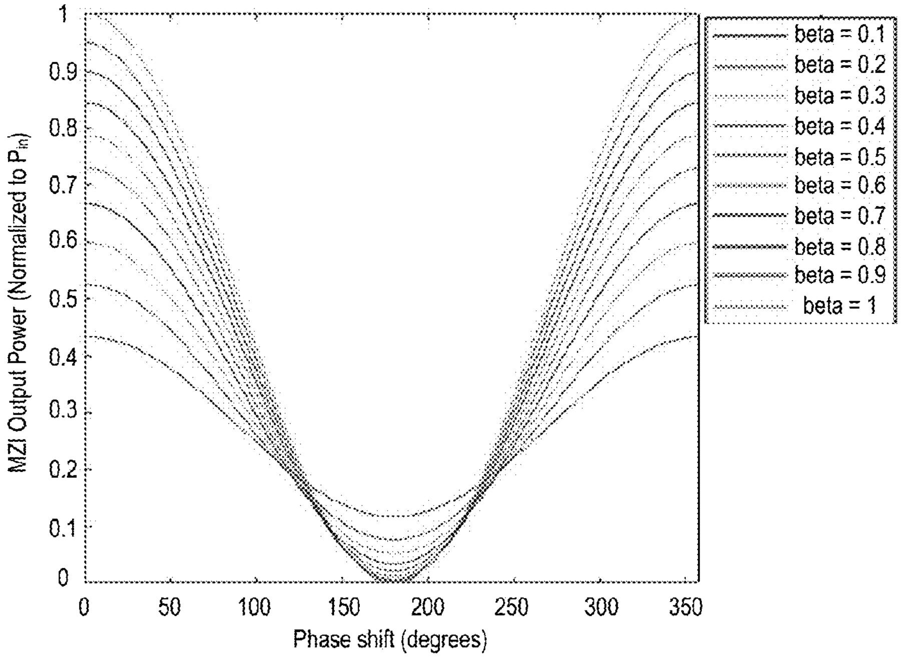
FIG. 6G is a graph of normalized power output versus phase shift at different $\beta$ values for the configuration of FIG. 6D.

FIG. 6F shows the extracted $\theta_1$ as a function of coupler length L, and FIG. 6G shows the normalized $P_{MZI}$ as a function of phase shift $\theta_1$ at different $\beta$ values. Finally, $\theta_2$ can be extracted by fitting $\theta_1$ as a function of coupling length L.

Arrayed Waveguide Grating with Reusable Delay Line

Figure 7A:
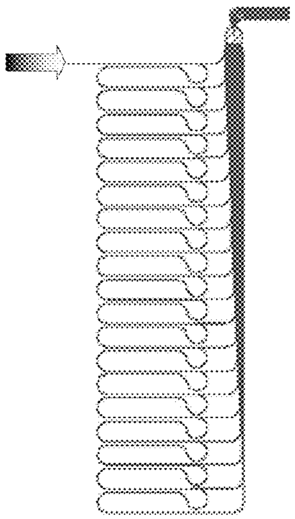
FIGS. 7A-7B show fabricated AWG-RDL configurations designed to provide resolving powers of 30,000 and 120,000, respectively.
Figure 7B:

Based on the above-noted calculations, two designs were generated—a first configuration (AWG-RDL #1) with a targeted resolving power of 30,000, as shown in FIG. 7A, and a second configuration (AWG-RDL #2) with a targeted resolving power of 120,000, as shown in FIG. 7B. The design specifications of each configuration are summarized in Table. 1 below. For each configuration, the number of waveguides forming the array of coupling devices was chosen to be 20, and the number of the output channels was chosen to be 8, although other numbers of coupling devices and/or output channels are also possible according to one or more contemplated embodiments. While these configurations had a limited free spectral range (FSR), in some embodiments, more arrayed waveguides and/or output channels can be added to increase the FSR. The resulting footprints for these device configurations are reduced by more than 70 times as compared to that of conventional AWGs (e.g., with the same number of arrayed waveguides and grating orders, and with the same waveguide thickness).

TABLE 1

Summary of design specifications for fabricated configurations

| | AWG-RDL #1 | AWG-RDL #2 |
|---|---|---|
| Waveguide cross-section | 1.0 μm × 0.3 μm | 1.0 μm × 0.3 μm |
| Number of $2^{nd}$ waveguides | 20 | 20 |
| Grating order | 1600 | 8000 |
| FSR @ 1550 nm | 0.91 nm | 0.182 nm |
| ΔL | 1637.372 μm | 8186.860 μm |
| Number of outputs | 8 | 8 |
| Targeted resolving power | 30,000 | 120,000 |
| Minimum radius of curvature | 60 μm | 60 μm |
| AWG-RDL Footprint | 0.9 mm × 2.9 mm ($2.61\ mm^2$) | 4.2 mm × 2.9 mm ($12.18\ mm^2$) |

Each configuration was fabricated on a $Si_3N_4/SiO_2$ on silicon platform, which provides benefits such as but not limited to low optical losses, transparency over a wide wavelength range (e.g., 400-2350 nm), and compatibility with complementary metal-oxide semiconductor (CMOS) and wafer-scale foundry processes. Each AWG-RDL was constructed using layers of 10-μm thermal oxide ($SiO_2$) as the bottom cladding layer, 300-nm silicon nitride ($Si_3N_4$) deposited by low-pressure chemical vapor deposition (LPCVD) as the core layer, and 3-μm oxide ($SiO_2$) deposited by plasma-enhanced chemical vapor deposition (PECVD) as the top cladding. Compared to thinner silicon nitride films, this geometry has lower bending losses in waveguides with small radii of curvature (e.g., for a 60-μm radius bend, the bending loss was 0.37 dB/m), which allows the design of ultra-compact AWG-RDLs. Each AWG-RDL was patterned by a 100 keV e-beam system (ELS-G100, sold by STS Elionix of Wellesley Hills, Massachusetts). A 10-nm Cr film was deposited as the mask to etch the 300-nm $Si_3N_4$ layer.

Compared to the conventional AWGs, the process of etching may be more critical in AWG-RDLs, as the transmitted power and phase of the directional couplers can be sensitive to the etching depth and quality (e.g., sidewall roughness). To achieve the expected power and phase distribution to the output FPR, the etching rate was carefully calibrated.

To test operation of each AWG-RDL configuration, a polarization maintaining tunable laser source (81607A Tunable Laser Source, sold by Keysight Technologies of Santa Rosa, California) operating over a wavelength range of 1450-1640 nm was used. The laser source had a narrow linewidth (e.g., 0.1 μm) and a high signal to total source spontaneous emission ratio (e.g., >70 dB). A polarization maintaining single mode fiber (PM1550) with a typical mode-field diameter of 10.1 μm and a numerical aperture of 0.125 was used to carry the signal from the tunable laser source to the AWG-RDL and out to the power meter. The polarization of the signal entering the AWG-RDL was controlled by a high precision fiber rotator (HFR007 Fiber Rotator, sold by Thorlabs, Inc. of Newton, New Jersey). The fibers were butt-coupled to the AWG-RDL using precision 3-axis stages (e.g., <100 nm alignment tolerance). A power meter (N7744A Power Meter, sold by Keysight Technologies of Santa Rosa, California) with a dynamic range of 65 dB was used to analyze the transmitted signal.

Figure 8A:
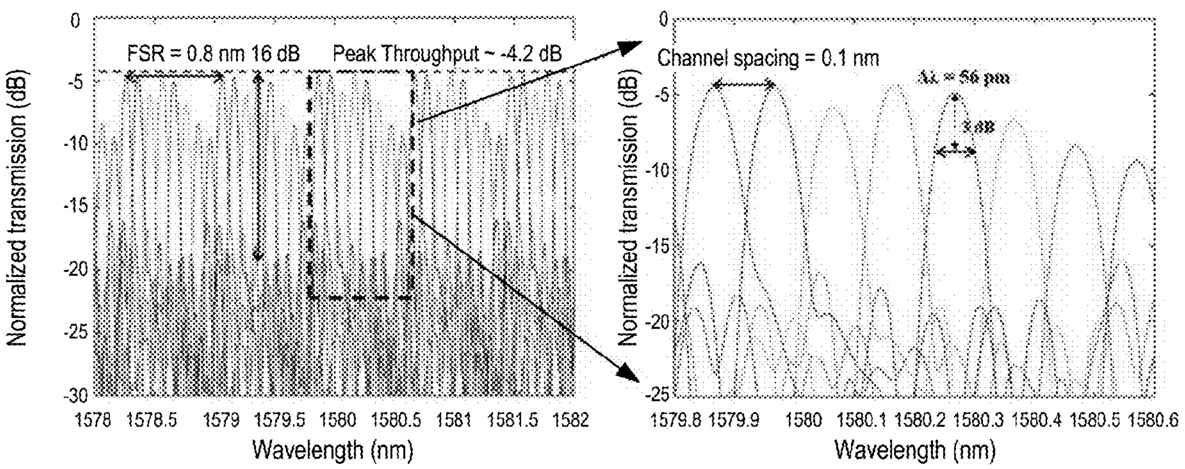
FIG. 8A show graphs of the transmission spectra for the AWG-RDL configuration of FIG. 7A.
Figure 8B:
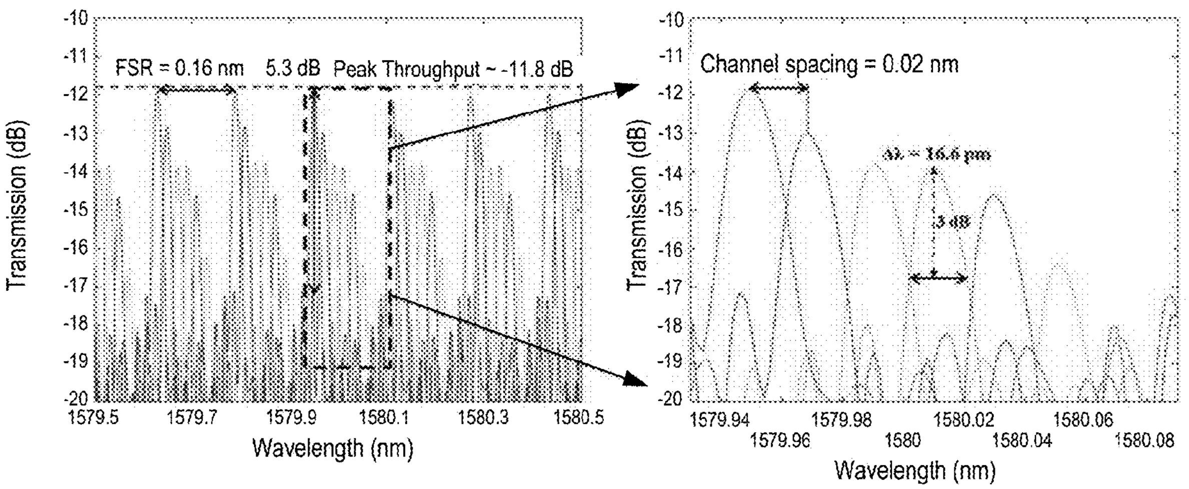
FIG. 8B show graphs of the transmission spectra for the AWG-RDL configuration of FIG. 7B.

The transmission response of each output channel of the AWG-RDLs was measured using the measurement setup described above. The overall throughputs of AWG-RDL #1 and AWG-RDL #2 are plotted as functions of wavelength, as shown in FIGS. 8A-8B, respectively. The experimental results show that the concept to reuse the delay line to reduce the footprint works well. As shown in FIG. 8A, for the AWG-RDL #1 with a targeted R of 30,000, the throughput was measured to be −4.2 dB in the wavelength bandwidth of 1575-1580 nm, the FSR was measured to be 0.8 nm, and the crosstalk was measured to be ~16 dB. The channel spacing between output channels was measured to be 0.1 nm, and the 3-dB transmission bandwidth was measured to be 56 μm, corresponding to a resolving power of 28,000 at 1580 nm. With the capability to fabricate the device in a compact area (e.g., 0.9×2.9 $mm^2$) and with an ultra-low-loss waveguide (e.g., <0.02 dB/cm), the achieved resolving power was in good agreement with the theoretical value (30,000). Note that the throughput can be increased further by using high coupling efficiency fiber-to-waveguide couplers with mode-matching ultra-high numerical aperture (UHNA) fibers or lensed fibers. The relative uneven transmission levels at different output channels was due to the power distribution difference between the simulated result and real device, which can be further improved by more accurate characterization of the power distribution.

FIG. 8B shows the transmission response for the AWG-RDL #2 with a targeted R of 120,000. The throughput was measured to be −11.8 dB, which is 7.6 dB lower than that of AWG-RDL #1. The crosstalk was measured to be ~5.3 dB, which was worse than that of AWG-RDL #1. The degradation of both throughput and crosstalk were mostly due to the phase errors introduced by the fabrication process in a larger area (e.g., 4.2×2.9 $mm^2$), which depends on the stability of the fabrication process across the dispersive area of the device. As a result, the measured resolving power of AWG-RDL #2 was 95,000 despite the targeted value of 120,000. Nevertheless, the smaller footprint offered by both RDL-AWG configurations (as compared to conventional AWG devices) helps to minimize phase errors. And improved fabrication process controls can yield even better results for ultra-high resolving power.

Figure 9A:
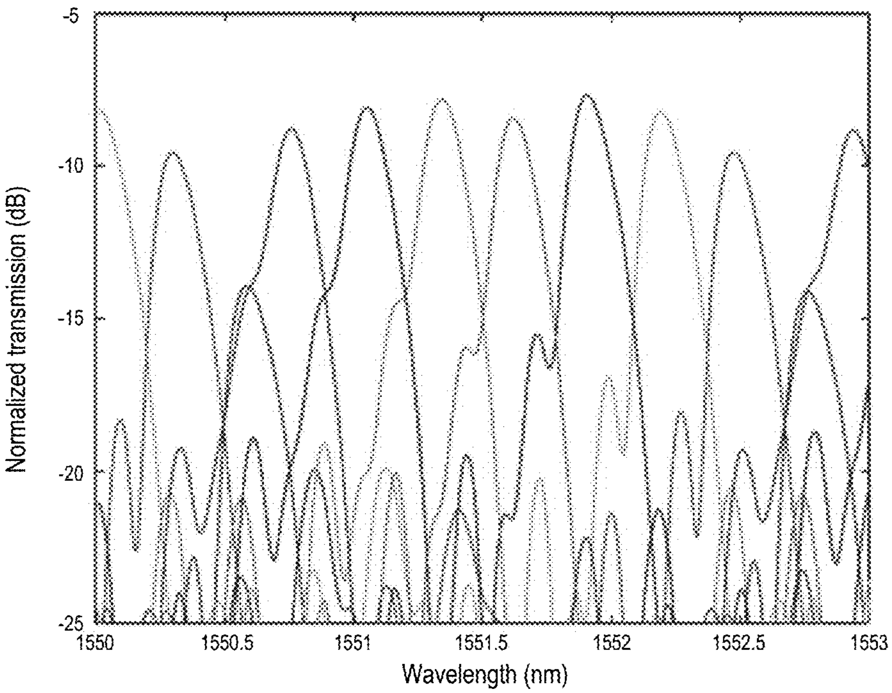
FIGS. 9A-9B show graphs of the transmission spectra for AWG-RDLs having the unit cell configuration of FIG. 4A and designed to provide resolving powers of 10,000 and 29,600, respectively.
Figure 9B:
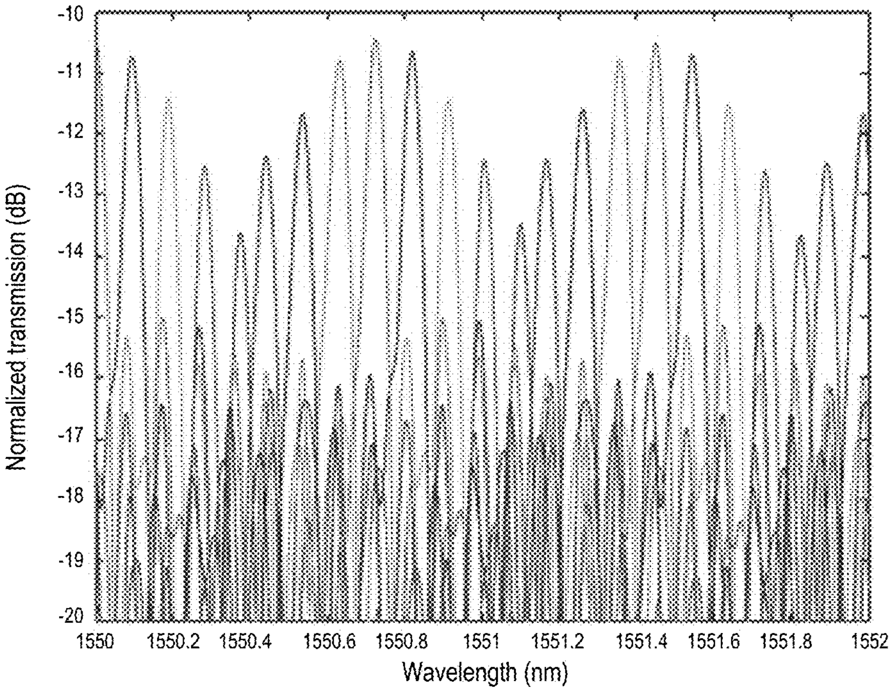

Additional AWG-RDLs having the configuration of FIG. 4A were also fabricated. The additional AWG-RDLs were also fabricated on the ultra-low loss $Si_3N_4/SiO_2$ on a silicon platform described above. The experimental data for AWG-RDLs with targeted resolving power, R, of 10,000 and 29,600 are shown in FIGS. 9A-9B, respectively. The measured R at 1550 nm was 8,812 and 27,780, respectively, which was in good agreement with the simulated results. The footprints of the devices compared to conventional AWGs were reduced by factors of 22 and 71, respectively. The relatively high noise level in the experimental results was due to the phase distribution difference between the simulated results and real device, which can be mitigated by a more accurate characterization of phase in the directional couplers.

Arrayed Waveguide Grating with Spiral Reusable Delay Line

Figure 10:
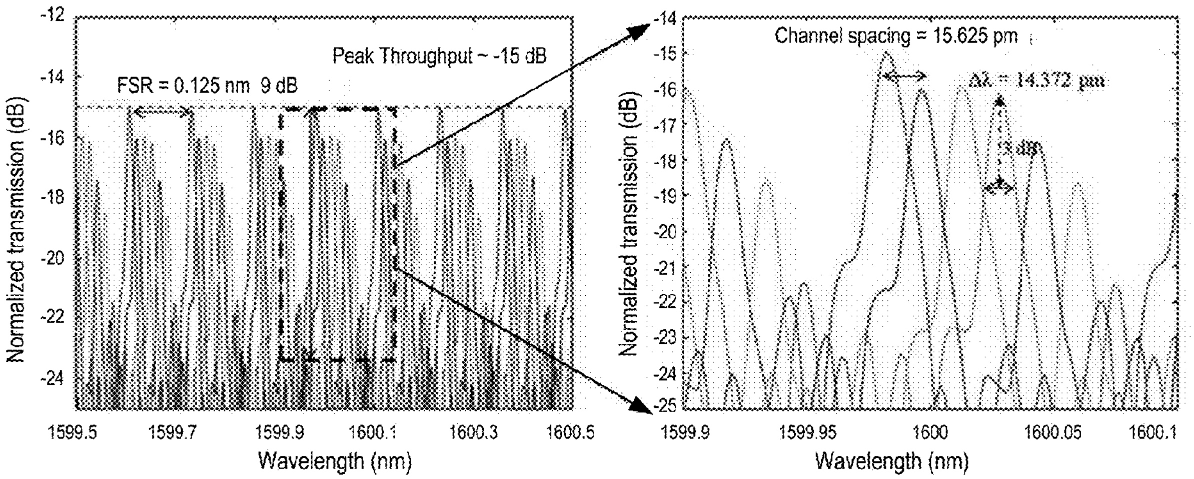
FIG. 10 shows graphs of the transmission spectra for an AWG-RDL configuration of FIG. 4C and designed to provide a resolving power of 120,000.

An AWG-RDL having the configuration of FIG. 4C was also fabricated. The device was fabricated on the ultra-low loss (<0.02 dB/cm) $Si_3N_4/SiO_2$ on silicon platform described above. The AWG-RDL was again patterned using the 100 keV e-beam system (Elionix ELS-G100). The footprint of the device was reduced roughly by a factor of 100 compared to a conventional AWG with the same number of arrayed waveguides and grating orders, and with the same thickness of $Si_3N_4$. The resulting experimental data is shown in FIG. 10. The measured resolving power was 111,330, much higher than for any previous AWG uncompensated devices. The on-chip peak throughput was around −15 dB with a FSR of 0.125 nm, and the crosstalk was measured to be 9 dB. With the capability to fabricate the device in a compact area (e.g., 1.5×5.5 $mm^2$) and low loss spiral unit, the measured resolving power was in good agreement with the theoretical value (120,000). The insertion loss and crosstalk can be further reduced by correcting for bending losses, mode mismatches, and/or phase errors.

Computer Implementation

Figure 11:
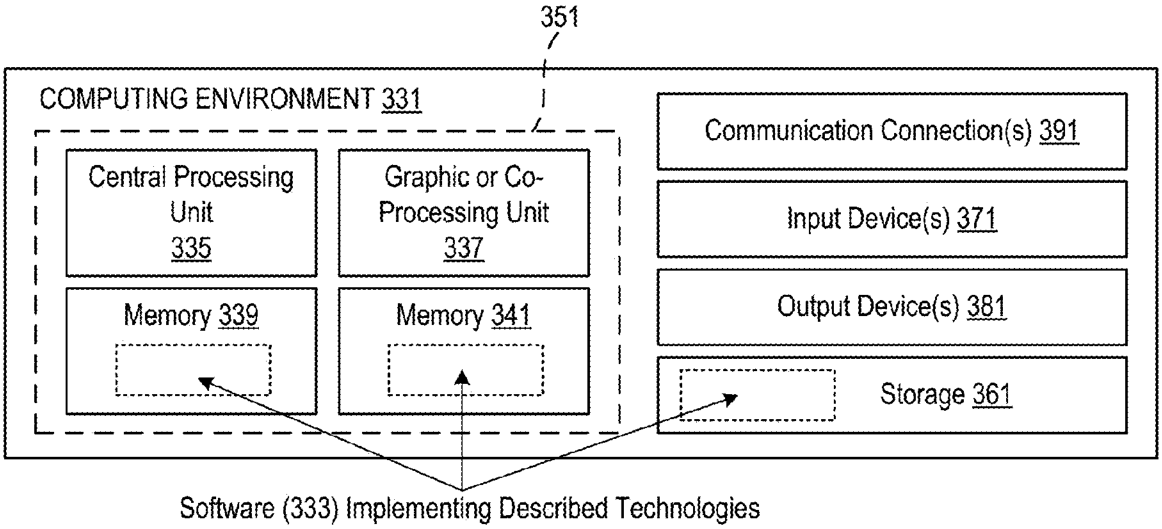
FIG. 11 depicts a generalized example of a computing environment in which the disclosed technologies may be implemented.

FIG. 11 depicts a generalized example of a suitable computing environment 331 in which the described innovations may be implemented, such as but not limited to aspects of a multiplexer system controller, a demultiplexer system controller, coupler calculation process 600, etc. The computing environment 331 is not intended to suggest any limitation as to scope of use or functionality, as the innovations may be implemented in diverse general-purpose or special-purpose computing systems. For example, the computing environment 331 can be any of a variety of computing devices (e.g., desktop computer, laptop computer, server computer, tablet computer, etc.).

With reference to FIG. 11, the computing environment 331 includes one or more processing units 335, 337 and memory 339, 341. In FIG. 11, this basic configuration 351 is included within a dashed line. The processing units 335, 337 execute computer-executable instructions. A processing unit can be a central processing unit (CPU), processor in an application-specific integrated circuit (ASIC), or any other type of processor (e.g., hardware processors, graphics processing units (GPUs), virtual processors, etc.). In a multi-processing system, multiple processing units execute computer-executable instructions to increase processing power. For example, FIG. 11 shows a central processing unit 335 as well as a graphics processing unit or co-processing unit 337. The tangible memory 339, 341 may be volatile memory (e.g., registers, cache, RAM), non-volatile memory (e.g., ROM, EEPROM, flash memory, etc.), or some combination of the two, accessible by the processing unit(s). The memory 339, 341 stores software 333 implementing one or more innovations described herein, in the form of computer-executable instructions suitable for execution by the processing unit(s).

A computing system may have additional features. For example, the computing environment 331 includes storage 361, one or more input devices 371, one or more output devices 381, and one or more communication connections 391. An interconnection mechanism (not shown) such as a bus, controller, or network interconnects the components of the computing environment 331. Typically, operating system software (not shown) provides an operating environment for other software executing in the computing environment 331, and coordinates activities of the components of the computing environment 331.

The tangible storage 361 may be removable or non-removable, and includes magnetic disks, magnetic tapes or cassettes, CD-ROMs, DVDs, or any other medium which can be used to store information in a non-transitory way, and which can be accessed within the computing environment 331. The storage 361 can store instructions for the software 333 implementing one or more innovations described herein.

The input device(s) 371 may be a touch input device such as a keyboard, mouse, pen, or trackball, a voice input device, a scanning device, or another device that provides input to the computing environment 331. The output device(s) 371 may be a display, printer, speaker, CD-writer, or another device that provides output from computing environment 331.

The communication connection(s) 391 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or any other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java™, Python®, and/or any other suitable computer language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

CONCLUSION

Any of the features illustrated or described herein, for example, with respect to FIGS. 1-11, can be combined with any other feature illustrated or described herein, for example, with respect to FIGS. 1-11, to provide configurations, systems, devices, methods, and/or embodiments not otherwise illustrated or specifically described herein. All features described herein are independent of one another and, except where structurally impossible, can be used in combination with any other feature described herein. In view of the many possible embodiments to which the principles of the disclosed technology may be applied, it should be recognized that the illustrated embodiments are only examples and should not be taken as limiting the scope of the disclosed technology. Rather, the scope is defined by the following claims. Applicant therefore claims all that comes within the scope and spirit of these claims.

The invention claimed is:

1. An arrayed waveguide grating (AWG) system comprising:

a delay line comprising a continuous first waveguide connected to receive input electromagnetic radiation (EMR) having a plurality of wavelengths;

a plurality of coupling devices, each coupling device comprising a second waveguide coupled to a respective portion of the continuous first waveguide; and a free propagation region (FPR) having an input end and an output end, the input end being coupled to separately receive the EMR from the second waveguides of the coupling devices, the output end being where the EMR is directed to spatially-separated output channels based on wavelength, wherein the plurality of coupling devices and the delay line are configured to control power and phase distributions of the EMR transmitted to the FPR.

2. The AWG system of claim 1, wherein each coupling device comprises a directional coupler, a Y-splitter, or a multimode interferometer (MMI) splitter.

3. The AWG system of claim 1, wherein:

each coupling device is a directional coupler with the second waveguide thereof having a portion spaced by a gap from the respective portion of the first waveguide over a coupling length, and the transmitted power and phase distributions are controlled by sizes of the gaps and the coupling lengths.

4. The AWG system of claim 3, wherein the size of the gap and/or the coupling length for each coupling device is different from that of others of the plurality of coupling devices.

5. The AWG system of claim 1, wherein the plurality of coupling devices and the delay line are constructed to control the transmitted power distribution such that one or more of the output channels has a non-Gaussian profile.

6. The AWG system of claim 1, wherein each coupling device and respective portion of the first waveguide form a delay unit, and the portion of the first waveguide in each delay unit is curved along at least a part of its length.

7. The AWG system of claim 6, wherein a shape of each delay unit in plan view is substantially the same as the other delay units.

8. The AWG system of claim 1, wherein each of the first and second waveguides comprises a core material surrounded by a cladding material in a cross-sectional view, and wherein:

(a) the core material comprises silicon nitride ($Si_3N_4$), lithium niobate ($LiNbO_3$), silicon carbide (SiC), or a III-V semiconductor;

(b) the cladding material comprises silicon oxide ($SiO_2$); or both (a) and (b).

9. The AWG system of claim 1, wherein the first waveguide is disposed on a first plane, and at least a portion of each second waveguide is disposed on a second plane different from the first plane.

10. The AWG system of claim 1, wherein:

the system is constructed to provide a resolving power at the output channels of at least 100,000; and the delay line, the plurality of coupling devices, and the FPR are contained within a planar area of 12.5 $mm^2$ or less.

11. The AWG system of claim 1, wherein, for each coupling device:

an input end of the second waveguide is coupled to the respective portion of the continuous first waveguide; and an output end of the second waveguide is directly coupled to the input end of the FPR.

12. An arrayed waveguide grating (AWG) system comprising:

a delay line comprising a continuous first waveguide connected to receive input electromagnetic radiation (EMR) having a plurality of wavelengths;

a plurality of coupling devices, each coupling device comprising a second waveguide coupled to a respective portion of the continuous first waveguide; and a free propagation region (FPR) having an input end and an output end, the input end being coupled to receive the EMR from each of the coupling devices, the output end being where the EMR is directed to spatially-separated output channels based on wavelength, wherein the plurality of coupling devices and the delay line are configured to control power and phase distributions of the EMR transmitted to the FPR, wherein each coupling device and respective portion of the first waveguide form a delay unit, and the portion of the first waveguide in each delay unit is curved along at least a part of its length, and wherein, in each delay unit, the portion of the first waveguide therein is shaped as one or more spirals.

13. The AWG system of claim 12, wherein the first and second waveguides are substantially coplanar.

14. A method comprising:

(a) providing input electromagnetic radiation (EMR) to a continuous first waveguide of a delay line, the EMR having a plurality of wavelengths;

(b) transmitting, via a plurality of coupling devices, the EMR to a free propagation region (FPR), each coupling device comprising a second waveguide coupled to a respective portion of the continuous first waveguide, the FPR having an input end and an output end, the input end being coupled to separately receive the EMR from the second waveguides of the coupling devices, the output end being where the EMR is directed to spatially-separated output channels based on wavelength; and (c) collecting, via one or more detectors disposed at the output end or an array of waveguides disposed at the output end, the EMR in the spatially-separated output channels, wherein configurations of the plurality of coupling devices and the delay line control power and phase distributions of the EMR transmitted to the FPR.

15. The method of claim 14, wherein each coupling device comprises a directional coupler, a Y-splitter, or a multimode interferometer (MMI) splitter.

16. The method of claim 14, wherein the EMR is input to the delay line without passing through another free propagation region.

17. The method of claim 14, wherein a resolving power at the output channels is at least 10,000.

18. The method of claim 14, wherein:

each coupling device is a directional coupler with the second waveguide thereof having a portion spaced by a gap from the respective portion of the first waveguide over a coupling length, the transmitted power and phase distributions are controlled by sizes of the gaps and the coupling lengths, and the size of the gap and/or the coupling length for each coupling device is different from that of others of the plurality of coupling devices.

19. The method of claim 14, wherein, for each coupling device:

an input end of the second waveguide is coupled to the respective portion of the continuous first waveguide; and an output end of the second waveguide is directly coupled to the input end of the FPR.

20. A method comprising:

(a) providing input electromagnetic radiation (EMR) to a continuous first waveguide of a delay line, the EMR having a plurality of wavelengths;

(b) transmitting, via a plurality of coupling devices, the EMR to a free propagation region (FPR), each coupling device comprising a second waveguide coupled to a respective portion of the continuous first waveguide, the FPR having an input end and an output end, the input end being coupled to receive the EMR from each of the coupling devices, the output end being where the EMR is directed to spatially-separated output channels based on wavelength; and (c) collecting, via one or more detectors disposed at the output end or an array of waveguides disposed at the output end, the EMR in the spatially-separated output channels, wherein configurations of the plurality of coupling devices and the delay line control power and phase distributions of the EMR transmitted to the FPR, and wherein the EMR collected in one or more of the output channels has a non-Gaussian profile.

* * * * *